United States Patent [19]

Lawson

[11] 4,328,408
[45] May 4, 1982

[54] MICROPROCESSOR FOR OVEN CONTROL

[75] Inventor: James A. Lawson, Dallas, Tex.

[73] Assignee: Texas Instruments Incorporated, Dallas, Tex.

[21] Appl. No.: 729,053

[22] Filed: Oct. 4, 1976

[51] Int. Cl.³ .............................................. H05B 6/68
[52] U.S. Cl. .............................. 219/10.55 B; 219/506
[58] Field of Search ................. 219/10.55 R, 10.55 B, 219/10.55 E, 506; 307/64, 296

[56] References Cited

U.S. PATENT DOCUMENTS

| | | | |
|---|---|---|---|
| 3,753,001 | 8/1973 | Hiroshima et al. | 307/64 |
| 3,819,906 | 6/1974 | Gould, Jr. | 219/506 |
| 3,982,141 | 9/1976 | Copeland | 307/296 |
| 4,011,428 | 3/1977 | Fosnough et al. | 219/506 |
| 4,038,510 | 7/1977 | White | 219/10.55 E |

OTHER PUBLICATIONS

E. A. Torrero, "An Introduction to Microprocessors", *Electronic Design* 9, pp. 58-62, 4/26/76.
A. J. Weissberger, "Microprocessors Simplify Industrial Control", *Electronic Design* 22, 10/25/75, pp. 96-99.
George D. Hanchett, "Turn-On Reset Pulse Circuits", RCA *Technical Notes*, 3/28/73.

*Primary Examiner*—C. C. Shaw
*Attorney, Agent, or Firm*—Melvin Sharp; Richard L. Donaldson; Gary C. Honeycutt

[57] ABSTRACT

A microprocessor for oven control has a keyboard for data and instruction entry and a display for displaying desired data, including the oven duty cycle. The microprocessor incorporates a random access memory for storing data entered from the keyboard and also incorporates a read-only memory which controls the operation of the microprocessor for its dedicated purpose.

3 Claims, 12 Drawing Figures

| | Fig. 4a | Fig. 4b |
|---|---|---|
| Fig. 4c | Fig. 4d | Fig. 4e |
| Fig. 4f | Fig. 4g | Fig. 4h |

MICROPROCESSOR FOR OVEN CONTROL

BACKGROUND OF THE INVENTION

Field of the Invention

This invention relates to oven controllers for controlling temperature, duty cycle and time intervals. More specifically, it relates to a microprocessor whose function is dedicated as an oven controller by a read-only memory.

In the past, oven controllers have been simple electrical-mechanical devices consisting of a control for manually setting a temperature and another for setting a timer to sound an alarm when the desired time has elapsed. More sophisticated controllers permitted setting a time for the oven to start and a time for the oven to stop, automatically.

With the advent of the microwave oven, the problem of controlling the operation became somewhat more complex. For example, the duty cycle of the magnetron which produces the microwaves for cooking should be one value for thawing and another for cooking a non-frozen item with a variance also required for the different kinds of items to be cooked. For example, to bake potatoes may require a different magnetron duty cycle than to bake a turkey. In prior art oven controllers, the duty cyle is manually controlled by simply referring to a cook book provided by the oven manufacturer to obtain a listed duty cycle and then simply setting a dial according to the listed duty cycle.

More modern microwave oven controllers utilize solid state electronic techniques for the control circuitry, such circuitry dedicated to the particular purpose. That is, if a new function is desired, new circuitry must be designed and implemented to achieve that new function. The prior art has progressed to the point where time and duty cycle may be set to operate in a so-called time mode.

BRIEF SUMMARY OF THE INVENTION

In the instant invention, not only a time mode is available, but also a temperature mode. The temperature mode is a mode wherein the desired final temperature of the item to be cooked is set and all other operations then are automatic. For example, if the item is frozen, a particular duty cycle of the magnetron must be selected, with the magnetron then shut off for a period of time. A second magnetron duty cycle may then be selected for a specified period of time and finally a third duty cycle of the magnetron may be selected to bring the item to be cooked to the desired temperature. These particular functions are available through the use of a microprocessor controlled by a ROM. The time and temperature of each of these cooking cycles is stored in a random access memory at three memory levels. That is, at memory level 1, the thawing time and power level (magnetron duty cycle) is stored. At memory level 2, the second cooking period and power level is stored. Finally, at level 3, the third cooking time and power level is stored. These parameters may be set by appropriate commands entered through a capacitive touch plate. Alternately they are automatically sequenced by selecting the temperature mode, in conjunction with the use of a probe having a thermistor sensor inserted into the item to be cooked, by simply selecting the final internal temperature desired for the item to be cooked and at what power level cooking is to take place. To achieve more and/or different functions, the ROM is simply replaced so that the controller is extremely flexible.

The main object of this invention is to provide an oven controller with extreme versatility, capable of operating in a time mode or in a temperature mode.

Another object of this invention is to provide an oven controller whose repertoire of functions may be readily augmented and/or altered.

Still another object of this invention is to provide a controller that is simple to operate, yet controls a complex sequence.

These and other objects will become evident in the detailed description that follows.

BRIEF DESCRIPTIONS OF THE DRAWINGS

DETAILED DESCRIPTION OF THE INVENTION

Figure 1:
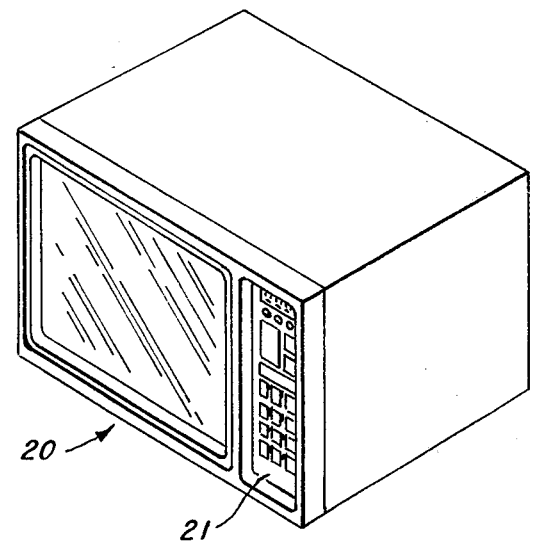
FIG. 1 is a perspective of the oven assembly containing the oven controller.

FIG. 1 illustrates an oven 20 having a controller with capacitive touch panel 21.

Figure 2:
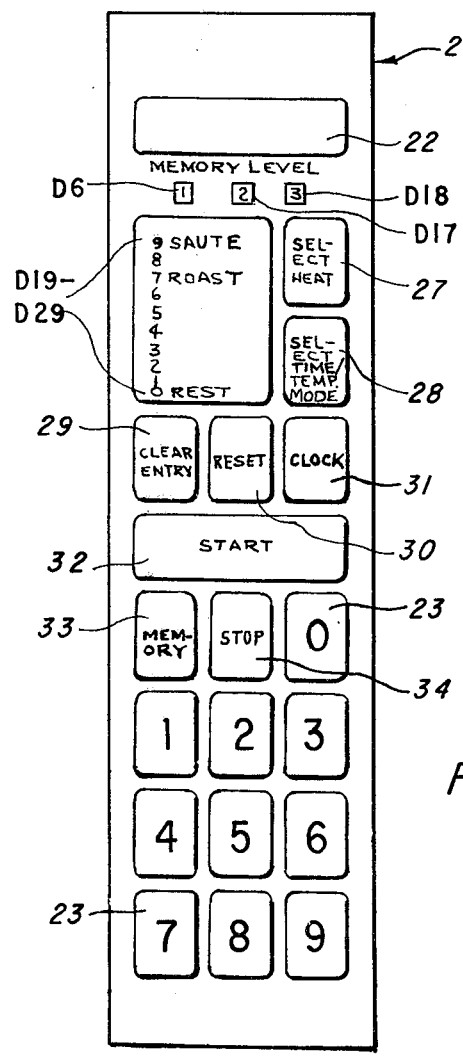
FIG. 2 is a front view of the capacitive touch panel for activating the controller.

FIG. 2 illustrates in detail the various components of capacitive touch panel 21. Display 22, in this preferred embodiment, is a type TIL 373 manufactured by the assignee of this invention, Texas Instruments Incorporated, P. O. Box 5474, Dallas, Tex., 75222. Display 22 is used for displaying time of day, cooking time, temperature, etc. Visual light emitting diodes (LED's) D16, D17 and D18 indicate three memory levels. LED's D19–D29 indicate the duty cycle selected for operation of the oven magnetron. Pad 27 is to "select heat", pad 28 is to "select time" (temp), pad 29 is to "clear entry", pad 30 is for "reset", pad 31 is for "clock", pad 32 is for "start", pad 33 is for "memory" and pad 34 is for "stop". Pads 23 are for "numerical entry".

Figures 3, 4:
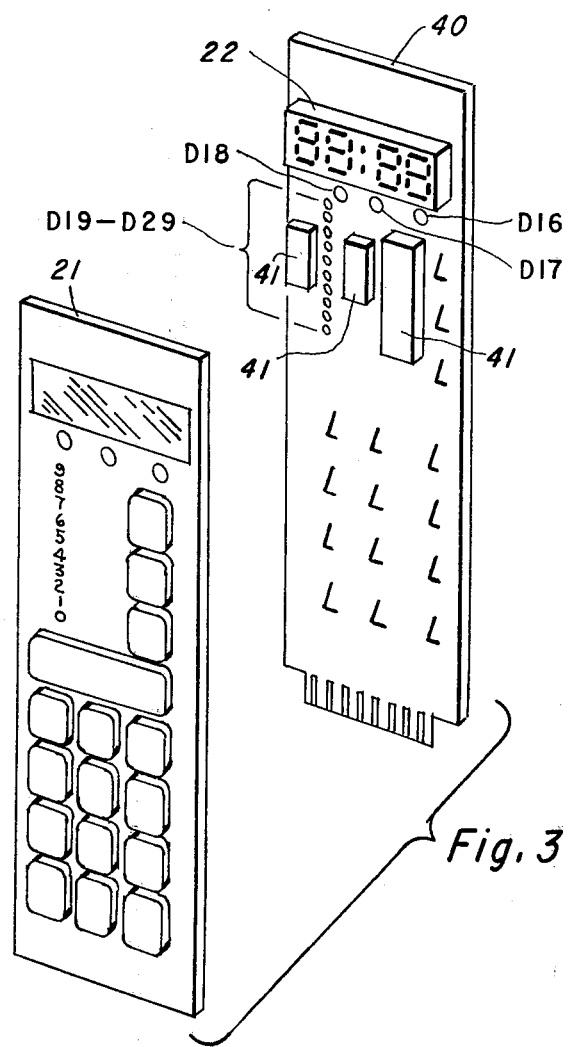
FIG. 3 is an exploded view illustrating the relationship of the capacitive touch panel to the controller electronics.
FIG. 4 is a schematic diagram of the electronics of the invention.

FIG. 3 illustrates the capacitive touch panel 21 and its spatial relationship with logic board 40. Logic board 40 contains the light emitting diodes D16–D29, display 22 and integrated circuits 41.

Referring now to FIG. 4, the schematic diagram of the oven controller of this invention is shown. Primary winding T1 of transistor 87 is connected to terminals 85 and 86 across which an AC voltage is impressed. Varistor VR1 is connected across primary T1. The secondary of transformer T1 includes a first secondary winding with taps forming secondary circuits T2, T3 and T4, and a secondary winding T5. Terminal 84 of the secondary winding T2 is connected to the anode of diode D4, whose cathode is connected to one terminal of fuse F1, the other terminal of fuse F1 being connected to the intersection of one end of resistors R1 and R3 and one terminal of capacitor C6, whose other terminal is grounded. The other end of transistor R1 is tied to the collector of transistor Q3 whose emitter is connected to −15 volts, and whose base is connected to ground through resistor R2. The cathode of Zener diode D5 is connected to the other end of resistor R3 and to one terminal of capacitor C7, at which point a +62 volts is developed for scanning the capacitive touch plate 21.

The other terminal of C7 is grounded. The anode of Zener diode D5 is grounded. Terminal 88 of secondary circuit T4 is connected to the cathode of diode D7 and terminal 89 of circuit T5 is connected to input terminal 82. Capacitor C1 is connected from terminal 89 to ground.

Terminal 85 of the secondary circuit T2 is connected to the cathode of diode D1 whose anode is connected to the anode of diode D2, this intersection providing a rectified, unregulated measurement of the amplitude of the input voltage. The cathode of diode D2 is connected to terminal 87 of the secondary circuit T4. Terminal 86 of secondary circuit T4 is connected to ground. The intersection of the anodes of diodes D1 and D2 is connected to one terminal of capacitor C2 whose other terminal is grounded, to one end of resistor R4 and to the emitter of transistor Q1, which together with transistor Q2 forms a compound Darlington pair. The collector of transistor Q1 is connected to the emitter of transistor Q2 whose collector is connected to the base of transistor Q1 and whose base is connected to one end of resistor R5 and to the anode of Zener diode D3 whose cathode is connected to ground. The other end of resistor R5 is connected to the other end of resistor R4 and to one terminal of capacitor C3 whose other terminal is connected to ground. The collector of transistor Q1 is also connected to the cathodes of diodes D36 and D35, the anode of diode D36 supplying $-15$ volts, unregulated for activating display 22 driver transistors Q6–Q9, speaker 70 driver transistor Q10, and LED driver transistors Q13–Q16. The cathode of transistor Q1 is further connected to one terminal of capacitor C4 whose other terminal is connected to ground. The anode of diode D35 is connected to one terminal of capacitor C5 whose other terminal is connected to ground and to switch S1 which is connected in series to the base of transistor Q3. The anode of diode D35 supplies $-15$ volts, regulated.

The intersection of the anodes of diodes D1 and D2, where unregulated rectified voltage which is directly proportional to the AC line voltage is present, is connected to one end of resistor R7 whose other end is connected to the intersection of one end of resistor R6 and one terminal of capacitor C8, the other end of resistor R6 and the other terminal of C8 being connected to ground. Resistors R6 and R7 and capacitors C8 form an integrating circuit for integrating the unregulated voltage. The intersection of resistors R7, R6 and capacitor C8 serves as one input to comparator 52. The other input of comparator 52 is connected to ground through resistor R11 and to $-15$ volts through resistor R12, thereby establishing a threshold voltage. The output of comparator 52 is connected through resistor R14 to ground and through resistor R15 to its other input, forming a Schmidt trigger. Comparator 52 (also comparators 51, 53 and 54) are type LM 2901B "Quad Single-Supply Comparator" manufactured by Raytheon Semiconductor, described in that company's "Linear IC's", Pages 4-6 through 4-9, dated January, 1976. The output of comparator 52 is inverted through inverter 55 and connected to pin 9 (test) of microprocessor 66. In this preferred embodiment, microprocessor 66 is a TMS 1000 manufactured by Texas Instruments Incorporated.

The cathode of diode D2 is connected to the cathode of diode D6, the anode of diode D6 being connected to one end of resistor R8 whose other end is connected through resistor R9 to ground and to one input of comparator 51. The other input to comparator 51 is connected through resistor R11 to ground and through resistor R12 to $-15$ volts as is the other input of comparator 52. The output of comparator 51, which provides a 60 Hertz square wave pulse for clocking purposes, is connected through resistor R13 to ground and is also connected to pin 14 (input F1) of capacitive touch keyboard interface 80. Capacitive touch keyboard interface 80 is a TMS 1976 manufactured by Texas Instruments.

Pin 3 ($R_{10}$) of microprocessor 66 is connected through resistor R81 to the anode of diode D13 and to one terminal of capacitor C13. One input of comparator 54 is connected through resistor R86 to one terminal of capacitor C16 whose other terminal is connected to $-15$ volts. The one input of comparator 54 is also connected through resistor R86 and through resistor R87 to the output of comparator 54, to the cathode of diode D13, to ground through resistor R83 and to the other input of comparator 54 through resistors R84 and R85. The connection between resistors R84 and R85 is connected to the other input of each of comparators 51 and 52. The output of comparator 54 is also connected to the cathode of diode D14 whose anode is connected through resistor R82 to pin 1 ($R_8$) of microprocessor 66 and to one terminal of capacitor C11.

Comparator 54, together with resistors R83–R85 and capacitors C16 and C17 form an oscillator whose output is applied to capacitors C11 and C13, respectively.

Pin 1 ($R_8$) of microprocessor 66 is connected through resistor R82 to the anode of diode D14 whose cathode is connected to the cathode of diode D13. The anode of diode D14 is also connected to one terminal of capacitor C11 whose other terminal is connected to the base of transistor Q4. The emitter of transistor Q4 is connected through resistor R16 to the anode of diode D7 and to one terminal of capacitor C9 whose other terminal is connected to terminal 82. Capacitor C10 has one terminal connected to input line terminal 82 and the other terminal connected through resistor R10 to the main terminal 2 of Triac SCR1. The gate Triac SCR1 is connected to the collector of transistor Q4 and the other terminal of SCR1 is connected to input line terminal 82. The output of silicon controlled rectifier SCR1 is used to supply power for an oven fan motor, lamp and filament to terminal L1 through door interlock switch 92.

The other terminal of capacitor C13 is connected to the base of transistor Q5 whose emitter is connected through resistor R18 to the anode of diode D7. The collector of transistor Q5 is connected to the gate of Triac SCR2 whose output is connected through magnetron transformer 81 primary and through door interlock switch S2 to terminal L1.

Main terminal 1 of Triac SCR2 is connected to terminal 82 of the input line and to one terminal of capacitor C12 whose other terminal is connected through resistor R88 to the main terminal 2 of SCR2.

Temperature probe thermistor 53 is connected at one end to 0 volts and at the other through resistor R20 to one input of comparator 53, to one terminal of capacitor C14, whose other terminal is connected to 0 volts, and through resistor R21 ton $-15$ volts. The other terminal of comparator 53 is connected through R22 to $-15$ volts, and the output of comparator 53 is connected throgh resistor R29 to 0 volts and serves as one input to AND circuit 56 whose other input is connected to pin 2 ($R_9$) of microprocessor 66. The output of AND circuit 56 is connected to the anode of diode D9 whose cathode is connected to pin 6 ($K_2$) of microprocessor 66 and to pin 2 ($K_2$) of capacitive interface 80. Probe switch S3 is connected at one end to 0 volts and at the other end through resistor R30 to −15 volts, to the input of inverter 57 and through resistors R45 to pin 12 and R46 to pin 13 of display 22. Resistors R31–R37 are connected in parallel to −15 volts and in series through resistors R38–R44, respectively, to pins 16, 3, 6, 8, 10, 11 and 13 of transistor array 62. Transistor array 62 is manufactured by RCA and is a type CA-3082—"General Purpose High Current N-P-N Transistor Array". The other end of resistors R31–R37 are also connected to pins 11–17 ($O_6$–$O_0$) of microprocessor 66. Resistors R23–R26 are connected in parallel to the other input of comparator 53 and their other ends are connected to pins 17–14 of microprocessor 66. Resistor R27 is connected at one end to the common node of resistors R23–R26, through resistor R28 to 0 volts. Resistor R27 at the other end is connected to pin 28 ($R_7$) of microprocessor 66 and through resistor R72 to −15 volts and through resistor R73 to the anode of diode D15 and to the input of inverter 72. Pin 2 of microprocessor 66 is connected through resistor R71 to −15 volts and to the input of inverter 71 whose output is connected to the cathode of diode D15. The output of inverter 72 is connected through resistor R80 to the base of transistor Q16. Pins 25, 26, and 27 are connected through resistors R77–R79 to the bases of transistors Q13, Q14 and Q15 and through resistors R74, R75 and R76 to −15 volts. The emitters of transistors Q13–Q16 are connected to −15 volts, unregulated, and their collectors are connected to the cathodes of LED's D16–D18, D26–D29, D22–D25 and D19–D21, respectively. The anodes of LED's D16, D21, D25 and D29 are connected together into pin 6 of display 22. The anode of LED's D17, D20, D24 and D28 are connected together to pin 5 of display 22. The anodes of diodes D19, D18, D23 and D27 are connected together and to pin 4 of display 22. The anode of LED's 22 and 26 are connected together to pin 3 of display 22. Pins 14, 12, 9, 7, 4, 2 and 1 of transistor array 62 are connected through resistors R47–R53, respectively, to pins 6, 5, 4, 3, 8 and 9 of display 22. Transistors Q6–Q9 have their collectors connected respectively to pins 10, 11, 16 and 14 of display 22. Their emitters are hooked together to −15 volts unregulated. The bases of transistors Q6–Q9 are connected through R54–R57, respectively, through R58–R61, respectively, to −15 volts, and to pins 24 ($R_3$)–21 ($R_0$) of microprocessor 66. Pin 21 of microprocessor 26 is also connected through resistor R65 to the base of Q11. Pin 23 of microprocessor 66 is connected through resistor R66 to the base of transistor Q12.

Pin 22 ($R_1$) of microprocessor 66 is connected to the anode of diode D11 whose cathode is connected to pin 15 (RST) of capacitive interface 80. Pin 24 ($R_3$) of microprocessor 66 is connected to the anode of diode D12 whose cathode is connected to the cathode of diode D11.

Transistors Q11 and Q12 and resistors R67 and R68 are used in the selection process to select which particular keyboard pad has been touched. The emitters of transistors Q11 and Q12 are connected together to −15 volts. The collector of transistor Q11 is connected to one column of keyboard pads on keyboard 21 and the collector of Q12 is connected to a second column of pads. The collectors of transistors Q11 and Q12 are connected respectively through resistor R67 and resistor R68 to +62 volts.

Pins 5 ($C_1$)–pin 13 ($C_9$) of capacitive interface 80 are connected to keyboard 21 to pads "Clear Entry" and "Reset", "Start" and "Select Heat", "Memory" and "Select Time", "High Heat" and "Clock", "0" and "5", "1" and "6", "2" and "9", "3" and "8", and "4" and "9", respectively. The selection of one pad of the pair of two is accomplished through the Q11–Q12 transistor circuits.

Speaker 70 is connected at one terminal to 0 volts and at the other through resistor R63 to the emitter of transistor Q10 whose collector is connected to a −15 volt unregulated supply. The base of transistor Q10 is connected through resistor R62 to the output of inverter 60 which inverts the output of AND circuit 59. AND circuit 59 has one input connected to pin 24 ($R_3$) of microprocessor 66 and the other input to AND circuit 59 is connected to pin 22 ($R_1$) of microprocessor 66.

Pins 5, 6, 7 and 8 ($K_1$, $K_2$, $K_4$, $K_8$) of microprocessor 66 are connected to pins 1, 2, 3 and 4, respectively ($K_1$, $K_2$, $K_4$, $K_8$) of capacitive interface 80. Pins 14 ($F_1$) and 17 ($V_{ref}$) of interface 80 are connected to the output of comparator 51 and to 0 volts through R69 and −15 volts through R70, respectively.

A read-only memory (ROM) controls the operation of microprocessor 66. The ROM has permanent instructions set therein. The following listing represents the Page Address (PAD) in hexadecimal, the absolute address (LOC) in hexadecimal, and the objects code, in binary notation.

| PAD | LOC | OBJECT CODE | PAD | LOC | OBJECT CODE |
|---|---|---|---|---|---|
| 000 | 003 | 0100 0000 | 033 | 00E | 0101 1000 |
| 001 | 004 | 00100011 | 027 | 01D | 10 011101 |
| 003 | 00C | 10 111111 | | | |
| 007 | 01C | 0101 0010 | 00E | 03B | 10 011011 |
| 00F | 03C | 10 111101 | 01D | 037 | 0101 0100 |
| 01F | 03F | 00101111 | 03A | 029 | 10 000110 |
| 03F | 03E | 00000010 | 035 | 016 | 00100011 |
| 03E | 039 | 00001010 | 02B | 02D | 0100 1111 |
| 03D | 036 | 001111 00 | 016 | 018 | 00001001 |
| 03B | 02E | 00100001 | 02C | 032 | 10 010111 |
| 037 | 01E | 00001010 | 018 | 020 | 0111 0000 |
| 02F | 03D | 00001101 | 030 | 001 | 10 000101 |
| 01F | 038 | 0101 0000 | 021 | 005 | 001101 01 |
| 03C | 031 | 10 110011 | 002 | 00B | 10 010011 |
| 039 | 026 | 10 110101 | 005 | 014 | 001101 00 |

| | | |
|---|---|---|
| 00B | 02C | 10 010011 |
| 017 | 01F | 001110 00 |
| 02E | 03A | 10 010011 |
| 01C | 030 | 001110 01 |
| 038 | 021 | 10 010011 |
| 031 | 006 | 00011100 |
| 023 | 00D | 10 000000 |
| 006 | 01B | 0101 1100 |
| 00D | 034 | 10 101101 |
| 01B | 02F | 00011000 |
| 036 | 019 | 10 000000 |
| 02D | 035 | 0101 1010 |
| 01A | 028 | 10 100110 |
| 034 | 011 | 00100011 |
| 029 | 025 | 0100 1011 |
| 012 | 008 | 00001001 |
| 024 | 012 | 10 101010 |
| 008 | 023 | 001110 01 |
| 011 | 007 | 10 010011 |
| 022 | 00A | 001100 01 |
| 004 | 013 | 001110 11 |
| 009 | 024 | 10 001010 |
| 013 | 00F | 00100100 |
| 026 | 01A | 00001100 |
| 00C | 033 | 00101011 |
| 019 | 027 | 0101 0001 |
| 032 | 009 | 10 000111 |
| 025 | 015 | 10 000000 |
| 00A | 02B | 00010111 |
| 015 | 017 | 10 100101 |
| 02A | 02A | 00011000 |
| 014 | 010 | 001110 01 |
| 02B | 022 | 10 111001 |
| 010 | 000 | 00010000 |
| 020 | 002 | 10 010011 |
| 000 | 043 | 00100011 |
| 001 | 044 | 0100 1111 |
| 003 | 04C | 00001001 |
| 007 | 05C | 10 111110 |
| 00F | 07C | 001101 11 |
| 01F | 07F | 00010000 |
| 03F | 07E | 10 010011 |
| 03E | 079 | 001110 11 |
| 03D | 076 | 10 011111 |
| 03B | 06E | 00010110 |
| 037 | 05E | 001100 11 |
| 02F | 07D | 00100100 |
| 01E | 078 | 00001100 |
| 03C | 071 | 10 000000 |
| 039 | 066 | 001101 01 |
| 033 | 04E | 0100 1010 |
| 027 | 05D | 00001100 |
| 00E | 07B | 00011111 |
| 01D | 077 | 11 011101 |
| 03A | 069 | 00011100 |
| 035 | 056 | 11 110110 |
| 02B | 06D | 0100 1011 |

| | | |
|---|---|---|
| 016 | 058 | 001110 01 |
| 02C | 072 | 10 100001 |
| 018 | 060 | 00010000 |
| 030 | 041 | 10 000000 |
| 021 | 045 | 001101 01 |
| 002 | 04B | 00010111 |
| 005 | 054 | 10 000000 |
| 00B | 06C | 0100 1001 |
| 017 | 05F | 0110 0000 |
| 02E | 07A | 0100 0111 |
| 01C | 070 | 001110 01 |
| 038 | 061 | 10 011000 |
| 031 | 046 | 001110 11 |
| 023 | 04D | 10 001000 |
| 006 | 053 | 0110 0001 |
| 00D | 074 | 0100 0011 |
| 01B | 06F | 0110 1010 |
| 036 | 059 | 0100 0010 |
| 02D | 075 | 00010001 |
| 01A | 068 | 001110 00 |
| 034 | 051 | 10 110001 |
| 029 | 065 | 001110 10 |
| 012 | 048 | 10 001101 |
| 024 | 052 | 10 101110 |
| 008 | 063 | 001110 10 |
| 011 | 047 | 10 000100 |
| 022 | 04A | 10 000110 |
| 004 | 053 | 0110 0001 |
| 009 | 064 | 0100 0011 |
| 013 | 04F | 0110 1010 |
| 026 | 05A | 00011110 |
| 00C | 073 | 10 111010 |
| 019 | 067 | 0100 0010 |
| 032 | 049 | 001101 11 |
| 025 | 055 | 001111 10 |
| 00A | 06B | 001101 11 |
| 015 | 057 | 001111 01 |
| 02A | 06A | 001101 11 |
| 014 | 050 | 001111 11 |
| 028 | 062 | 001101 11 |
| 010 | 040 | 00001111 |
| 020 | 042 | 10 011000 |
| 000 | 083 | 0100 0000 |
| 001 | 084 | 001111 10 |
| 003 | 08C | 00100001 |
| 007 | 09C | 001111 00 |
| 00F | 08C | 00100000 |
| 01F | 0BF | 0101 0110 |
| 03F | 0BE | 10 000001 |
| 03E | 0B9 | 00001111 |
| 03D | 0B6 | 0100 0000 |
| 03B | 0AE | 001111 01 |
| 037 | 09E | 00100001 |
| 02F | 0BD | 001111 00 |
| 01E | 0B8 | 00100000 |
| 03C | 0B1 | 0101 0110 |
| 039 | 0A6 | 10 111011 |

| | | | | | | |
|---|---|---|---|---|---|---|
| 033 | 08E | 00001111 | | 037 | 0DE | 00001001 |
| 027 | 09D | 0100 0000 | | 02F | 0FD | 10 111001 |
| 00E | 0BB | 001111 11 | | 01E | 0F8 | 00010000 |
| 01D | 0B7 | 00100001 | | 03C | 0F1 | 10 000000 |
| 03A | 0A9 | 001111 00 | | 039 | 0E6 | 00001000 |
| 035 | 096 | 00100000 | | 033 | 0CE | 00001110 |
| 02B | 0AD | 0101 0110 | | 027 | 0DD | 0101 0000 |
| 016 | 098 | 10 001110 | | 00E | 0FB | 10 001101 |
| 02C | 0B2 | 00001111 | | 01D | 0F7 | 0100 1111 |
| 01B | 0A0 | 0100 0000 | | 03A | 0E9 | 001100 00 |
| 030 | 081 | 001111 00 | | 035 | 0D6 | 11 110110 |
| 021 | 085 | 00100001 | | 02B | 0ED | 00010010 |
| 002 | 08B | 001111 10 | | 016 | 0D8 | 00000101 |
| 005 | 094 | 0101 0001 | | 02C | 0F2 | 10 000011 |
| 00B | 0AC | 10 100011 | | 018 | 0E0 | 00100100 |
| 017 | 09F | 0100 1010 | | 030 | 0C1 | 00011001 |
| 02E | 0BA | 00000011 | | 021 | 0C5 | 00101011 |
| 01C | 0B0 | 0100 0010 | | 002 | 0CB | 10 001000 |
| 038 | 0A1 | 001101 11 | | 005 | 0D4 | 00011000 |
| 031 | 086 | 00001111 | | 00B | 0EC | 00101011 |
| 023 | 08D | 00100000 | | 017 | 0DF | 10 001011 |
| 006 | 09B | 10 110000 | | 02E | 0FA | 00011110 |
| 00D | 0B4 | 0100 0000 | | 01C | 0F0 | 00101011 |
| 01B | 0AF | 001111 00 | | 038 | 0E1 | 10 000000 |
| 036 | 099 | 00100001 | | 031 | 0C6 | 00010011 |
| 02D | 0B5 | 001111 01 | | 023 | 0CD | 00101011 |
| 01A | 0A8 | 0101 0001 | | 006 | 0DB | 10 000100 |
| 034 | 091 | 10 100010 | | 00D | 0F4 | 0100 1111 |
| 029 | 0A5 | 0100 1010 | | 01B | 0EF | 001100 01 |
| 012 | 088 | 00000011 | | 036 | 0D9 | 0100 0101 |
| 024 | 092 | 0100 0010 | | 02D | 0F5 | 0110 1111 |
| 008 | 0A3 | 001101 11 | | 01A | 0E8 | 0110 1111 |
| 011 | 087 | 00001111 | | 034 | 0D1 | 00001111 |
| 022 | 08A | 00100000 | | 029 | 0E5 | 00010010 |
| 004 | 093 | 10 011011 | | 012 | 0C8 | 00000101 |
| 009 | 0A4 | 0100 0000 | | 024 | 0D2 | 10 000000 |
| 013 | 08F | 001111 00 | | 008 | 0E3 | 00100100 |
| 026 | 09A | 00100001 | | 011 | 0C7 | 00011111 |
| 00C | 0B3 | 001111 11 | | 022 | 0CA | 00101011 |
| 019 | 0A7 | 0101 0001 | | 004 | 0D3 | 10 000100 |
| 032 | 089 | 10 101000 | | 009 | 0E4 | 00010111 |
| 025 | 095 | 0100 1010 | | 013 | 0CF | 00101011 |
| 00A | 0AB | 00000011 | | 026 | 0DA | 10 000101 |
| 015 | 097 | 0100 0010 | | 00C | 0F3 | 00011110 |
| 02A | 0AA | 001101 11 | | 019 | 0E7 | 00101011 |
| 014 | 090 | 00001111 | | 032 | 0C9 | 10 010011 |
| 028 | 0A2 | 00100000 | | 025 | 0D5 | 00010111 |
| 010 | 08C | 10 010011 | | 00A | 0EB | 00101011 |
| 000 | 0C3 | 00100100 | | 015 | 0D7 | 10 000000 |
| 001 | 0C4 | 00001100 | | 02A | 0EA | 00000011 |
| 003 | 0CC | 00101011 | | 014 | 0D0 | 001111 00 |
| 007 | 0DC | 00001101 | | 028 | 0E2 | 00011010 |
| 00F | 0FC | 00001101 | | 010 | 0C0 | 11 011010 |
| 01F | 0FF | 00001100 | | 020 | 0C2 | 10 011110 |
| 03F | 0FE | 00101100 | | 000 | 103 | 00000110 |
| 03E | 0F9 | 00001101 | | 001 | 104 | 00000111 |
| 03D | 0F6 | 00001101 | | 003 | 10C | 0100 0111 |
| 03B | 0EE | 00001100 | | 007 | 11C | 001110 00 |

| | | | | | | |
|---|---|---|---|---|---|---|
| 00F | 13C | 10 111100 | | 010 | 100 | 10 101010 |
| 01F | 13F | 001110 10 | | 020 | 102 | 10 101111 |
| 03F | 13E | 10 010111 | | 000 | 143 | 0100 0011 |
| 03E | 139 | 001110 11 | | 001 | 144 | 001111 10 |
| 03D | 136 | 10 101111 | | 003 | 14C | 00100001 |
| 03B | 12E | 001110 01 | | 007 | 15C | 00101011 |
| 037 | 11E | 10 010111 | | 00F | 17C | 00101011 |
| 02F | 13D | 00010000 | | 01F | 17F | 00101011 |
| 01E | 138 | 10 000000 | | 03F | 17E | 00101011 |
| 03C | 131 | 0100 1001 | | 03E | 179 | 001111 00 |
| 039 | 126 | 001110 00 | | 03D | 176 | 00000011 |
| 033 | 10E | 10 101111 | | 03B | 16E | 00101100 |
| 027 | 11D | 0110 1000 | | 037 | 15E | 00101100 |
| 00E | 13B | 0100 0010 | | 02F | 17D | 00101100 |
| 01D | 137 | 001110 01 | | 01E | 178 | 0101 0000 |
| 03A | 129 | 10 100001 | | 03C | 171 | 10 000001 |
| 035 | 116 | 001110 10 | | 039 | 166 | 00001111 |
| 02B | 12D | 10 000101 | | 033 | 14E | 0100 1100 |
| 016 | 118 | 001111 10 | | 027 | 15D | 001111 00 |
| 02C | 132 | 0100 1010 | | 00E | 17B | 00100001 |
| 018 | 120 | 00011100 | | 01D | 177 | 00101100 |
| 030 | 101 | 10 101010 | | 03A | 169 | 00101100 |
| 021 | 105 | 001111 11 | | 035 | 156 | 00101100 |
| 002 | 10B | 10 101100 | | 02B | 16D | 00101100 |
| 005 | 114 | 001111 01 | | 016 | 158 | 001111 10 |
| 00B | 12C | 10 101100 | | 02C | 172 | 00100000 |
| 017 | 11F | 0100 1001 | | 018 | 160 | 00101011 |
| 02E | 13A | 00100110 | | 030 | 141 | 00101011 |
| 01C | 130 | 10 011010 | | 021 | 145 | 0101 1111 |
| 038 | 121 | 0111 0000 | | 002 | 148 | 10 100111 |
| 031 | 106 | 10 101111 | | 005 | 154 | 00001111 |
| 023 | 10D | 001100 00 | | 00B | 16C | 001111 11 |
| 006 | 11B | 00010111 | | 017 | 15F | 00100001 |
| 00D | 134 | 11 111010 | | 02E | 17A | 00101011 |
| 01B | 12F | 0100 0000 | | 01C | 170 | 00101011 |
| 036 | 119 | 00000011 | | 038 | 161 | 00101011 |
| 02D | 135 | 10 101111 | | 031 | 146 | 001111 00 |
| 01A | 128 | 001110 10 | | 023 | 14D | 00000011 |
| 034 | 111 | 10 100100 | | 006 | 15B | 00101100 |
| 029 | 125 | 001100 10 | | 00D | 174 | 00101100 |
| 012 | 108 | 10 010101 | | 01B | 16F | 0101 0000 |
| 024 | 112 | 001110 01 | | 036 | 159 | 10 001011 |
| 008 | 123 | 10 000100 | | 02D | 175 | 00001111 |
| 011 | 107 | 001100 01 | | 01A | 168 | 0100 1010 |
| 022 | 10A | 10 010101 | | 034 | 151 | 0110 0000 |
| 004 | 113 | 001110 11 | | 029 | 165 | 0110 0000 |
| 009 | 124 | 10 101111 | | 012 | 148 | 0110 0000 |
| 013 | 10F | 001100 11 | | 024 | 152 | 00000011 |
| 026 | 11A | 0100 0111 | | 008 | 163 | 0100 1010 |
| 00C | 133 | 001110 01 | | 011 | 147 | 001100 00 |
| 019 | 127 | 10 010101 | | 022 | 14A | 00000111 |
| 032 | 109 | 0100 1011 | | 004 | 153 | 10 010011 |
| 025 | 115 | 001110 10 | | 009 | 164 | 10 100000 |
| 00A | 12B | 10 101111 | | 013 | 14F | 001100 10 |
| 015 | 117 | 0100 0000 | | 026 | 15A | 00000111 |
| 02A | 12A | 00101110 | | 00C | 173 | 10 110010 |
| 014 | 110 | 00101011 | | 019 | 167 | 10 100000 |
| 028 | 122 | 0101 0010 | | | | |

| | | | | | | |
|---|---|---|---|---|---|---|
| 032 | 149 | 001100 01 | | 004 | 193 | 00011011 |
| 025 | 155 | 00000111 | | 009 | 1A4 | 10 000011 |
| 00A | 16B | 10 101010 | | 013 | 18F | 0100 0111 |
| 015 | 157 | 10 100000 | | 026 | 19A | 00101000 |
| 02A | 16A | 001100 11 | | 00C | 1B3 | 0111 1001 |
| 014 | 150 | 00101011 | | 019 | 1A7 | 10 010001 |
| 028 | 162 | 00000111 | | 032 | 189 | 0110 0000 |
| 010 | 140 | 10 010001 | | 025 | 195 | 0110 1000 |
| 020 | 142 | 00001111 | | 00A | 1AB | 10 100010 |
| 000 | 183 | 0100 0001 | | 015 | 197 | 00000011 |
| 001 | 184 | 001111 10 | | 02A | 1AA | 00001111 |
| 003 | 18C | 00101000 | | 014 | 190 | 00010000 |
| 007 | 19C | 0111 1010 | | 028 | 1A2 | 10 000000 |
| 00F | 1BC | 10 010101 | | | | |
| 01F | 1BF | 0110 0000 | | 000 | 1C3 | 0100 0111 |
| 03F | 1BE | 00101000 | | 001 | 1C4 | 001110 11 |
| 03E | 1B9 | 001111 00 | | 003 | 1CC | 10 111101 |
| 03D | 1B6 | 0100 0011 | | 007 | 1DC | 0110 0000 |
| 03B | 1AE | 001110 10 | | 00F | 1FC | 00011010 |
| 037 | 19E | 10 010110 | | 01F | 1FF | 11 110011 |
| 02F | 1BD | 00011001 | | 03F | 1FE | 00010000 |
| 01E | 1B8 | 11 000110 | | 03E | 1F9 | 10 000000 |
| 03C | 1B1 | 00001110 | | 03D | 1F6 | 0100 0011 |
| 039 | 1A6 | 00101001 | | 03B | 1EE | 0110 0000 |
| 033 | 18E | 10 101011 | | 037 | 1DE | 001110 01 |
| 027 | 19D | 0111 0101 | | 02F | 1FD | 10 111111 |
| 00E | 1BB | 10 111010 | | 01E | 1F8 | 0100 0111 |
| 01D | 1B7 | 10 101011 | | 03C | 1F1 | 001110 10 |
| 03A | 1A9 | 0100 0101 | | 039 | 1E6 | 10 011101 |
| 035 | 196 | 00001100 | | 033 | 1CE | 0110 0001 |
| 02B | 1AD | 00000111 | | 027 | 1DD | 00010001 |
| 016 | 198 | 001111 10 | | 00E | 1FB | 10 111001 |
| 02C | 1B2 | 0100 1001 | | 01D | 1F7 | 0110 0001 |
| 018 | 1A0 | 0111 1001 | | 03A | 1E9 | 0100 1011 |
| 030 | 181 | 10 010101 | | 035 | 1D6 | 001110 10 |
| 021 | 185 | 0110 0000 | | 02B | 1ED | 10 101110 |
| 002 | 18B | 00101000 | | 016 | 1D8 | 0100 1000 |
| 005 | 194 | 0111 1001 | | 02C | 1F2 | 00101000 |
| 00B | 1AC | 10 010001 | | 018 | 1E0 | 10 000100 |
| 017 | 19F | 0110 0000 | | 030 | 1C1 | 0111 0110 |
| 02E | 18A | 00101000 | | 021 | 1C5 | 10 000100 |
| 01C | 1B0 | 0111 1010 | | 002 | 1CB | 0100 0111 |
| 038 | 1A1 | 10 010001 | | 005 | 1D4 | 0110 0101 |
| 031 | 186 | 0101 1011 | | 00B | 1EC | 00010011 |
| 023 | 18D | 10 100001 | | 017 | 1DF | 10 000100 |
| 006 | 193 | 0110 0000 | | 02E | 1FA | 0100 0000 |
| 00D | 1B4 | 0100 1111 | | 01C | 1F0 | 00100110 |
| 01B | 1AF | 00101000 | | 038 | 1E1 | 10 001101 |
| 036 | 199 | 10 010011 | | 031 | 1C6 | 0100 1000 |
| 02D | 1B5 | 0100 0111 | | 023 | 1CD | 00101000 |
| 01A | 1A8 | 00101000 | | 006 | 1DB | 10 000100 |
| 034 | 191 | 0111 0100 | | 00D | 1F4 | 0100 0100 |
| 029 | 1A5 | 10 010001 | | 01B | 1EF | 00100001 |
| 012 | 188 | 0110 1000 | | 036 | 1D9 | 0111 1000 |
| 024 | 192 | 0110 1111 | | 02D | 1F5 | 10 000100 |
| 008 | 1A3 | 10 100010 | | 01A | 1E8 | 0111 0100 |
| 011 | 187 | 00000011 | | 034 | 1D1 | 10 010010 |
| 022 | 18A | 00001111 | | 029 | 1E5 | 10 000010 |

| | | | | | | |
|---|---|---|---|---|---|---|
| 012 | 1C8 | 0100 1000 | | 01B | 22F | 11 100111 |
| 024 | 1D2 | 00100001 | | 036 | 219 | 00011010 |
| 008 | 1E3 | 0111 0100 | | 02D | 235 | 11 011010 |
| 011 | 1C7 | 10 000100 | | 01A | 228 | 0100 0011 |
| 022 | 1CA | 10 000010 | | 034 | 211 | 001110 00 |
| 004 | 1D3 | 00011011 | | 029 | 225 | 10 001000 |
| 009 | 1E4 | 10 100101 | | 012 | 208 | 0100 1011 |
| 013 | 1CF | 0100 0111 | | 024 | 212 | 001100 11 |
| 026 | 1DA | 001110 01 | | 008 | 223 | 0100 0011 |
| 00C | 1F3 | 10 111111 | | 011 | 207 | 00010000 |
| 019 | 1E7 | 0100 1001 | | 022 | 20A | 001110 01 |
| 032 | 1C9 | 0110 0000 | | 004 | 213 | 10 000000 |
| 025 | 1D5 | 0100 0111 | | 009 | 224 | 00011101 |
| 00A | 1EB | 001110 11 | | 013 | 20F | 10 011001 |
| 015 | 1D7 | 10 010000 | | 026 | 21A | 0100 0000 |
| 02A | 1EA | 0110 1001 | | 00C | 233 | 00100110 |
| 014 | 1D0 | 00011000 | | 019 | 227 | 10 010101 |
| 028 | 1E2 | 10 001101 | | 032 | 209 | 0100 1000 |
| 010 | 1C0 | 001100 00 | | 025 | 215 | 00101000 |
| 020 | 1C2 | 10 111111 | | 00A | 22B | 10 101000 |
| 000 | 203 | 0100 0010 | | 015 | 217 | 0100 0010 |
| 001 | 204 | 00010100 | | 02A | 22A | 001100 11 |
| 003 | 20C | 001110 00 | | 014 | 210 | 00001111 |
| 007 | 21C | 11 011000 | | 028 | 222 | 0100 0010 |
| 00F | 23C | 001110 10 | | 010 | 200 | 001101 11 |
| 01F | 23F | 11 001101 | | 020 | 202 | 00001111 |
| 03F | 23F | 001110 01 | | 000 | 243 | 11 000110 |
| 03E | 239 | 11 001001 | | 001 | 244 | 0100 0010 |
| 03D | 236 | 001111 00 | | 003 | 24C | 001110 11 |
| 03B | 22E | 0100 0011 | | 007 | 25C | 10 111111 |
| 037 | 21E | 00011000 | | 00F | 27C | 00010001 |
| 02F | 23D | 001110 01 | | 01F | 27F | 10 111001 |
| 01E | 238 | 10 001101 | | 03F | 27E | 0100 0000 |
| 03C | 231 | 00010001 | | 03E | 279 | 00101010 |
| 039 | 226 | 001111 10 | | 03D | 276 | 10 101110 |
| 033 | 20E | 11 100110 | | 03B | 26E | 0101 1000 |
| 027 | 21D | 001110 11 | | 037 | 25E | 10 111100 |
| 00E | 23B | 10 101110 | | 02F | 27D | 00000110 |
| 01D | 237 | 001111 01 | | 01E | 278 | 10 111001 |
| 03A | 229 | 11 100110 | | 03C | 271 | 00000101 |
| 035 | 215 | 001110 11 | | 039 | 266 | 00100000 |
| 02B | 22D | 10 110001 | | 033 | 24E | 0101 0010 |
| 016 | 218 | 001111 11 | | 027 | 25D | 10 111110 |
| 02C | 232 | 11 100110 | | 00E | 27B | 00101100 |
| 018 | 220 | 001110 11 | | 01D | 277 | 00100110 |
| 030 | 201 | 10 001101 | | 03A | 269 | 10 001011 |
| 021 | 205 | 001111 00 | | 035 | 256 | 0101 0000 |
| 002 | 20B | 00010011 | | 02B | 26D | 10 000101 |
| 005 | 214 | 0100 0011 | | 016 | 258 | 00010111 |
| 00B | 22C | 0110 0100 | | 02C | 272 | 11 111010 |
| 017 | 21F | 10 000000 | | 018 | 260 | 001111 00 |
| 02E | 23A | 00010100 | | 030 | 241 | 0100 0111 |
| 01C | 230 | 11 000000 | | 021 | 245 | 00011110 |
| 038 | 221 | 10 110110 | | 002 | 24B | 10 110011 |
| 031 | 206 | 00010100 | | 005 | 254 | 0110 1111 |
| 023 | 20D | 11 111101 | | 00B | 26C | 00010101 |
| 006 | 21B | 10 110110 | | 017 | 25F | 10 000110 |
| 00D | 234 | 00010100 | | 02E | 27A | 00100000 |

| | | | | | | |
|---|---|---|---|---|---|---|
| 01C | 270 | 00101000 | | 021 | 285 | 001111 11 |
| 038 | 261 | 10 001110 | | 002 | 2AB | 00101010 |
| 031 | 246 | 0100 1100 | | 005 | 294 | 00000110 |
| 023 | 24D | 10 011101 | | 00B | 2AC | 00011001 |
| 006 | 25B | 001111 10 | | 017 | 29F | 11 000110 |
| 00D | 274 | 0100 0010 | | 02E | 2BA | 0100 0000 |
| 01B | 26F | 001110 11 | | 01C | 2B0 | 00100111 |
| 036 | 259 | 10 010010 | | 038 | 2A1 | 10 000110 |
| 02D | 275 | 001111 01 | | 031 | 286 | 00011001 |
| 01A | 268 | 001110 11 | | 023 | 28D | 10 010110 |
| 034 | 251 | 10 010010 | | 006 | 29B | 001111 00 |
| 029 | 265 | 001111 11 | | 00D | 2B4 | 0100 0011 |
| 012 | 248 | 0100 1010 | | 01B | 2AF | 00010001 |
| 024 | 252 | 00001111 | | 036 | 299 | 001110 11 |
| 00B | 263 | 0100 1011 | | 02D | 2B5 | 10 111001 |
| 011 | 247 | 001110 11 | | 01A | 2A8 | 00011001 |
| 022 | 24A | 10 010011 | | 034 | 291 | 11 000110 |
| 004 | 253 | 00010000 | | 029 | 2A5 | 00100110 |
| 009 | 264 | 10 000000 | | 012 | 288 | 10 100010 |
| 013 | 24F | 00010111 | | 024 | 292 | 0100 0001 |
| 026 | 25A | 10 100101 | | 008 | 2A3 | 00001100 |
| 00C | 273 | 0100 1100 | | 011 | 287 | 10 010000 |
| 019 | 267 | 00001101 | | 022 | 28A | 00010011 |
| 032 | 249 | 0100 1111 | | 004 | 293 | 11 111110 |
| 025 | 255 | 00101100 | | 009 | 2A4 | 00001001 |
| 00A | 26B | 10 100101 | | 013 | 28F | 10 001001 |
| 015 | 257 | 0100 1100 | | 026 | 29A | 00001100 |
| 02A | 26A | 00001100 | | 00C | 2B3 | 0100 0100 |
| 014 | 250 | 0100 1111 | | 019 | 2A7 | 00000111 |
| 028 | 262 | 00101100 | | 032 | 289 | 10 011001 |
| 010 | 240 | 10 101000 | | 025 | 295 | 00101100 |
| 020 | 242 | 00001111 | | 00A | 2AB | 10 011001 |
| 000 | 283 | 0100 1001 | | 015 | 297 | 0100 0001 |
| 001 | 284 | 00001100 | | 02A | 2AA | 00001101 |
| 003 | 28C | 0100 1111 | | 014 | 290 | 0100 0101 |
| 007 | 29C | 00100001 | | 028 | 2A2 | 00001101 |
| 00F | 2BC | 00011001 | | 010 | 280 | 00010000 |
| 01F | 2BF | 11 000110 | | 020 | 282 | 10 000000 |
| 03F | 2BE | 0100 0100 | | 000 | 2C3 | 001111 00 |
| 03E | 2B9 | 00100111 | | 001 | 2C4 | 0100 0000 |
| 03D | 2B6 | 10 110111 | | 003 | 2CC | 0110 0001 |
| 03B | 2AE | 10 110001 | | 007 | 2DC | 0101 0010 |
| 037 | 29E | 0111 0000 | | 00F | 2FC | 10 000011 |
| 02F | 2BD | 10 111100 | | 01F | 2FF | 0110 1111 |
| 01E | 2B8 | 10 000110 | | 03F | 2FE | 00010011 |
| 03C | 2B1 | 0100 0111 | | 03E | 2F9 | 10 010101 |
| 039 | 2A6 | 001111 11 | | 03D | 2F6 | 001111 11 |
| 033 | 28E | 00100001 | | 03B | 2EE | 00101111 |
| 027 | 29D | 00011001 | | 037 | 2DE | 00000010 |
| 00E | 2BB | 11 000110 | | 02F | 2FD | 00001010 |
| 01D | 2B7 | 0100 1000 | | 01E | 2F8 | 0100 1001 |
| 03A | 2A9 | 00100111 | | 03C | 2F1 | 00001101 |
| 035 | 296 | 10 010110 | | 039 | 2E6 | 0100 0011 |
| 02B | 2AD | 10 110001 | | 033 | 2CE | 00100000 |
| 016 | 298 | 0111 0000 | | 027 | 2DD | 00100000 |
| 02C | 2B2 | 10 110000 | | 00E | 2FB | 00100000 |
| 018 | 2A0 | 10 000110 | | 01D | 2F7 | 0110 1000 |
| 030 | 281 | 0100 1011 | | 03A | 2E9 | 0100 0011 |

| | | | | | | |
|---|---|---|---|---|---|---|
| 035 | 2D6 | 00101000 | | 03C | 331 | 0100 1111 |
| 02B | 2ED | 10 100100 | | 039 | 326 | 001100 10 |
| 016 | 2D8 | 00100000 | | 033 | 30E | 00001001 |
| 02C | 2F2 | 00001010 | | 027 | 31D | 10 101100 |
| 018 | 2E0 | 00001001 | | 00E | 33B | 001101 11 |
| 030 | 2C1 | 10 111000 | | 01D | 337 | 00011001 |
| 021 | 2C5 | 0100 1110 | | 03A | 329 | 001110 10 |
| 002 | 2CB | 00001100 | | 035 | 316 | 11 001100 |
| 005 | 2D4 | 00100100 | | 02B | 32D | 00010011 |
| 00B | 2EC | 00000010 | | 016 | 318 | 10 110011 |
| 017 | 2DF | 00001010 | | 02C | 332 | 001110 11 |
| 02E | 2FA | 00010101 | | 018 | 320 | 10 011101 |
| 01C | 2F0 | 10 000000 | | 030 | 301 | 00010110 |
| 038 | 2E1 | 00100110 | | 021 | 305 | 001100 11 |
| 031 | 2C6 | 10 001101 | | 002 | 30B | 11 000000 |
| 023 | 2CD | 0110 1010 | | 005 | 314 | 00100011 |
| 006 | 2DB | 10 111010 | | 00B | 32C | 0100 1001 |
| 00D | 2F4 | 0110 0000 | | 017 | 31F | 0111 1001 |
| 01B | 2EF | 00101000 | | 02E | 33A | 10 101101 |
| 036 | 2D9 | 0111 1001 | | 01C | 330 | 001111 00 |
| 02D | 2F5 | 10 101001 | | 038 | 321 | 00101000 |
| 01A | 2E8 | 0110 0000 | | 031 | 306 | 0111 1100 |
| 034 | 2D1 | 00101000 | | 023 | 30D | 10 010001 |
| 029 | 2E5 | 00000011 | | 006 | 31B | 0100 1000 |
| 012 | 2C8 | 10 111010 | | 00D | 334 | 00001100 |
| 024 | 2D2 | 0100 1110 | | 01B | 32F | 00010111 |
| 008 | 2E3 | 00001101 | | 036 | 319 | 10 000000 |
| 011 | 2C7 | 0100 0011 | | 02D | 335 | 00100001 |
| 022 | 2CA | 10 010110 | | 01A | 328 | 001111 00 |
| 004 | 2D3 | 0100 0010 | | 034 | 311 | 0100 1111 |
| 009 | 2E4 | 0110 0000 | | 029 | 325 | 0111 1000 |
| 013 | 2CF | 0101 1001 | | 012 | 308 | 10 110011 |
| 026 | 2DA | 10 001001 | | 024 | 312 | 001101 10 |
| 00C | 2F3 | 00001111 | | 008 | 323 | 10 110011 |
| 019 | 2E7 | 0100 1011 | | 011 | 307 | 00000011 |
| 032 | 2C9 | 00011010 | | 022 | 30A | 10 111100 |
| 025 | 2D5 | 001110 10 | | 004 | 313 | 0100 1001 |
| 00A | 2EB | 11 001011 | | 009 | 324 | 0110 0000 |
| 015 | 2D7 | 0100 0011 | | 013 | 30F | 0100 0111 |
| 02A | 2EA | 00011000 | | 026 | 31A | 001110 00 |
| 014 | 2D0 | 001110 00 | | 00C | 333 | 10 010101 |
| 028 | 2E2 | 10 011001 | | 019 | 327 | 001110 10 |
| 010 | 2C0 | 00010101 | | 032 | 309 | 10 010000 |
| 020 | 2C2 | 10 011010 | | 025 | 315 | 00010000 |
| | | | | 00A | 32B | 10 000000 |
| 000 | 303 | 0100 1011 | | 015 | 317 | 00101111 |
| 001 | 304 | 001101 11 | | 02A | 32A | 00000101 |
| 003 | 30C | 0100 0001 | | 014 | 310 | 00010010 |
| 007 | 31C | 00001100 | | 028 | 322 | 10 001110 |
| 00F | 33C | 0100 1001 | | 010 | 300 | 00010111 |
| 01F | 33F | 0110 0000 | | 020 | 302 | 10 101001 |
| 03F | 33E | 00001100 | | 000 | 343 | 00000011 |
| 03E | 339 | 00101111 | | 001 | 344 | 10 111011 |
| 03D | 336 | 00000111 | | 003 | 34C | 001111 00 |
| 03B | 32E | 00001010 | | 007 | 35C | 0100 0101 |
| 037 | 31E | 0100 1000 | | 00F | 37C | 00101010 |
| 02F | 33D | 00001101 | | 01F | 37F | 10 000000 |
| 01E | 33B | 00001111 | | 03F | 37E | 0100 1101 |

| | | | | | | |
|---|---|---|---|---|---|---|
| 03E | 379 | 00101010 | | 000 | 383 | 0100 1011 |
| 03D | 376 | 10 000000 | | 001 | 384 | 001110 11 |
| 03B | 36E | 0100 0111 | | 003 | 38C | 10 010010 |
| 037 | 35E | 001110 11 | | 007 | 39C | 0100 0011 |
| 02F | 37D | 10 111100 | | 00F | 3BC | 0110 0000 |
| 01E | 378 | 10 001110 | | 01F | 3BF | 001111 10 |
| 03C | 371 | 0100 1011 | | 03F | 3BE | 11 111010 |
| 039 | 366 | 001110 11 | | 03E | 3B9 | 11 110000 |
| 033 | 34E | 10 010111 | | 03D | 3B6 | 001111 01 |
| 027 | 35D | 10 101100 | | 03B | 3AE | 11 111010 |
| 00F | 37B | 001110 01 | | 037 | 39E | 11 110000 |
| 01D | 377 | 10 110000 | | 02F | 3BD | 001111 11 |
| 03A | 369 | 00011101 | | 01E | 3B8 | 11 111010 |
| 035 | 356 | 11 000100 | | 03C | 3B1 | 11 110000 |
| 02B | 36D | 00011010 | | 039 | 3A6 | 001111 00 |
| 016 | 358 | 11 000000 | | 033 | 38E | 0100 0111 |
| 02C | 372 | 00010000 | | 027 | 39D | 0110 0000 |
| 01B | 360 | 10 000000 | | 00E | 3BB | 00011011 |
| 030 | 341 | 0100 1101 | | 01D | 3B7 | 10 111010 |
| 021 | 345 | 00100110 | | 03A | 3A9 | 0100 0000 |
| 002 | 343 | 10 101100 | | 035 | 396 | 0110 0000 |
| 005 | 354 | 00010111 | | 02B | 3AD | 0110 1111 |
| 003 | 36C | 10 110011 | | 016 | 398 | 0101 0010 |
| 017 | 35F | 0100 0010 | | 02C | 3B2 | 10 101011 |
| 02E | 37A | 001110 11 | | 018 | 3A0 | 00001111 |
| 01C | 370 | 10 110100 | | 030 | 381 | 0100 1010 |
| 038 | 361 | 0100 1101 | | 021 | 385 | 0110 0101 |
| 031 | 346 | 00100110 | | 002 | 38B | 00001111 |
| 023 | 34D | 10 110110 | | 005 | 394 | 0100 0111 |
| 006 | 35B | 0100 0111 | | 00B | 3AC | 001110 01 |
| 00D | 374 | 0110 0001 | | 017 | 39F | 10 010010 |
| 01B | 36F | 10 100010 | | 02E | 3BA | 0100 1001 |
| 036 | 359 | 0100 0011 | | 01C | 3B0 | 0110 0000 |
| 02D | 375 | 0110 0000 | | 038 | 3A1 | 0100 0111 |
| 01A | 368 | 10 001001 | | 031 | 386 | 001110 11 |
| 034 | 351 | 0100 0111 | | 023 | 38D | 10 110110 |
| 029 | 365 | 00100001 | | 006 | 39B | 0110 0101 |
| 012 | 348 | 00000110 | | 00D | 3B4 | 00011000 |
| 024 | 352 | 10 111000 | | 01B | 3AF | 10 001101 |
| 008 | 363 | 001110 00 | | 036 | 399 | 0110 0101 |
| 011 | 347 | 10 100110 | | 02D | 3B5 | 0100 1011 |
| 022 | 34A | 0100 0011 | | 01A | 3A8 | 001110 11 |
| 004 | 353 | 0110 0001 | | 034 | 391 | 10 001000 |
| 009 | 364 | 00011111 | | 029 | 3A5 | 11 111010 |
| 013 | 34F | 10 101001 | | 012 | 388 | 00010000 |
| 026 | 35A | 0100 1101 | | 024 | 392 | 10 000000 |
| 00C | 373 | 00100110 | | 008 | 3A3 | 0100 0011 |
| 019 | 367 | 10 100010 | | 011 | 387 | 0110 1010 |
| 032 | 349 | 10 000110 | | 022 | 38A | 00010001 |
| 025 | 355 | 0100 0011 | | 004 | 393 | 0100 0010 |
| 00A | 36B | 001110 01 | | 009 | 3A4 | 001110 00 |
| 015 | 357 | 10 010000 | | 013 | 38F | 10 101110 |
| 02A | 36A | 00011000 | | 026 | 39A | 001110 10 |
| 014 | 350 | 11 011001 | | 00C | 3B3 | 10 110001 |
| 028 | 362 | 001111 00 | | 019 | 3A7 | 001110 01 |
| 010 | 340 | 00010001 | | 032 | 389 | 10 001101 |
| 020 | 342 | 10 000000 | | 025 | 395 | 0100 0011 |

| | | |
|---|---|---|
| 00A | 3AB | 0110 1000 |
| 015 | 397 | 0001 0011 |
| 02A | 3AA | 11 000000 |
| 014 | 390 | 0100 0111 |
| 028 | 3A2 | 0001 1110 |
| 010 | 380 | 10 110011 |
| 000 | 3C3 | 001111 00 |
| 001 | 3C4 | 11 001101 |
| 003 | 3CC | 001111 11 |
| 007 | 3DC | 11 001101 |
| 00F | 3FC | 001111 01 |
| 01F | 3FF | 11 001101 |
| 03F | 3FE | 001111 10 |
| 03E | 3F9 | 11 001101 |
| 03D | 3F6 | 0100 0111 |
| 03B | 3EE | 0110 0100 |
| 037 | 3DE | 0110 1000 |
| 02F | 3FD | 0100 0010 |
| 01E | 3F8 | 001100 00 |
| 03C | 3F1 | 001111 01 |
| 039 | 3E6 | 001100 10 |
| 033 | 3CE | 001111 11 |
| 027 | 3DD | 001100 01 |
| 00E | 3FB | 001111 00 |
| 01D | 3F7 | 0100 0110 |
| 03A | 3E9 | 0000 1101 |
| 035 | 3D6 | 0000 1001 |
| 02B | 3ED | 10 000010 |
| 016 | 3D8 | 0000 1100 |
| 02C | 3F2 | 0100 1011 |
| 018 | 3E0 | 001110 00 |
| 030 | 3C1 | 10 111000 |
| 021 | 3C5 | 10 110001 |
| 002 | 3CB | 0000 1100 |
| 005 | 3D4 | 0100 1011 |
| 00B | 3EC | 001110 00 |
| 017 | 3DF | 10 110001 |
| 02E | 3FA | 0110 1110 |
| 01C | 3F0 | 10 110001 |
| 038 | 3E1 | 0110 0010 |
| 031 | 3C6 | 0000 1111 |
| 023 | 3CD | 0001 0111 |
| 006 | 3DB | 10 000000 |
| 00D | 3F4 | 0100 1111 |
| 01B | 3EF | 0010 1111 |
| 036 | 3D9 | 0000 0011 |
| 02D | 3F5 | 0010 1100 |
| 01A | 3E8 | 10 110110 |
| 034 | 3D1 | 0000 1111 |
| 029 | 3E5 | 0100 1011 |
| 012 | 3C8 | 0001 1101 |
| 024 | 3D2 | 001110 10 |
| 008 | 3E3 | 10 111101 |
| 011 | 3C7 | 0001 1001 |
| 022 | 3CA | 10 000000 |
| 004 | 3D3 | 0100 1001 |
| 009 | 3E4 | 0110 0000 |
| 013 | 3CF | 0100 1011 |
| 026 | 3DA | 001110 11 |
| 00C | 3F3 | 10 010100 |
| 019 | 3E7 | 0100 0111 |
| 032 | 3C9 | 001110 11 |
| 025 | 3D5 | 10 010101 |
| 00A | 3EB | 0110 0010 |
| 015 | 3D7 | 0001 0000 |
| 02A | 3EA | 10 000000 |
| 014 | 3D0 | 0100 0111 |
| 028 | 3E2 | 0110 0011 |
| 010 | 3C0 | 0001 1011 |
| 020 | 3C2 | 10 101011 |

MODE OF OPERATION OF THE INVENTION

Figure 4A:
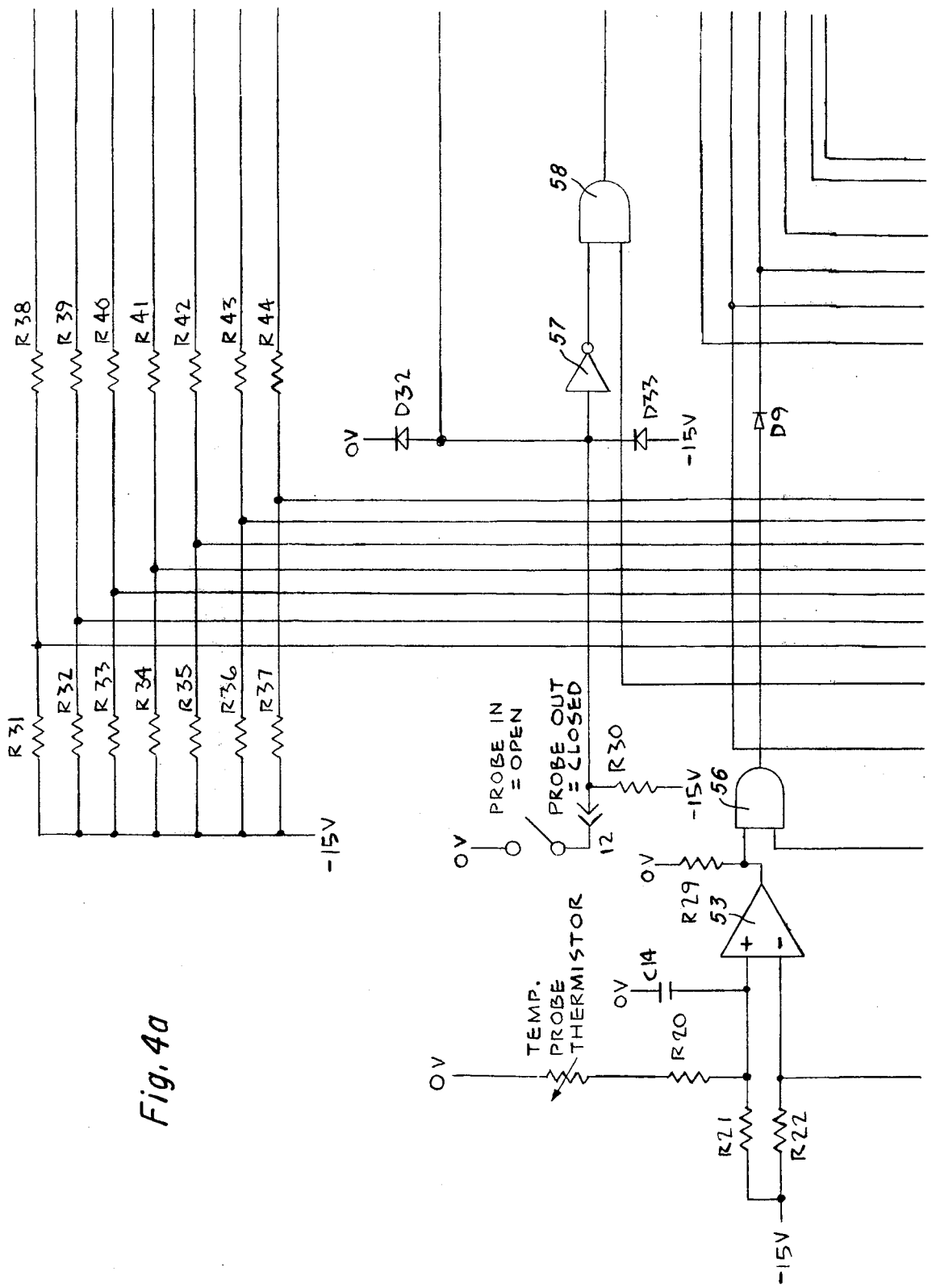
Figure 4B:
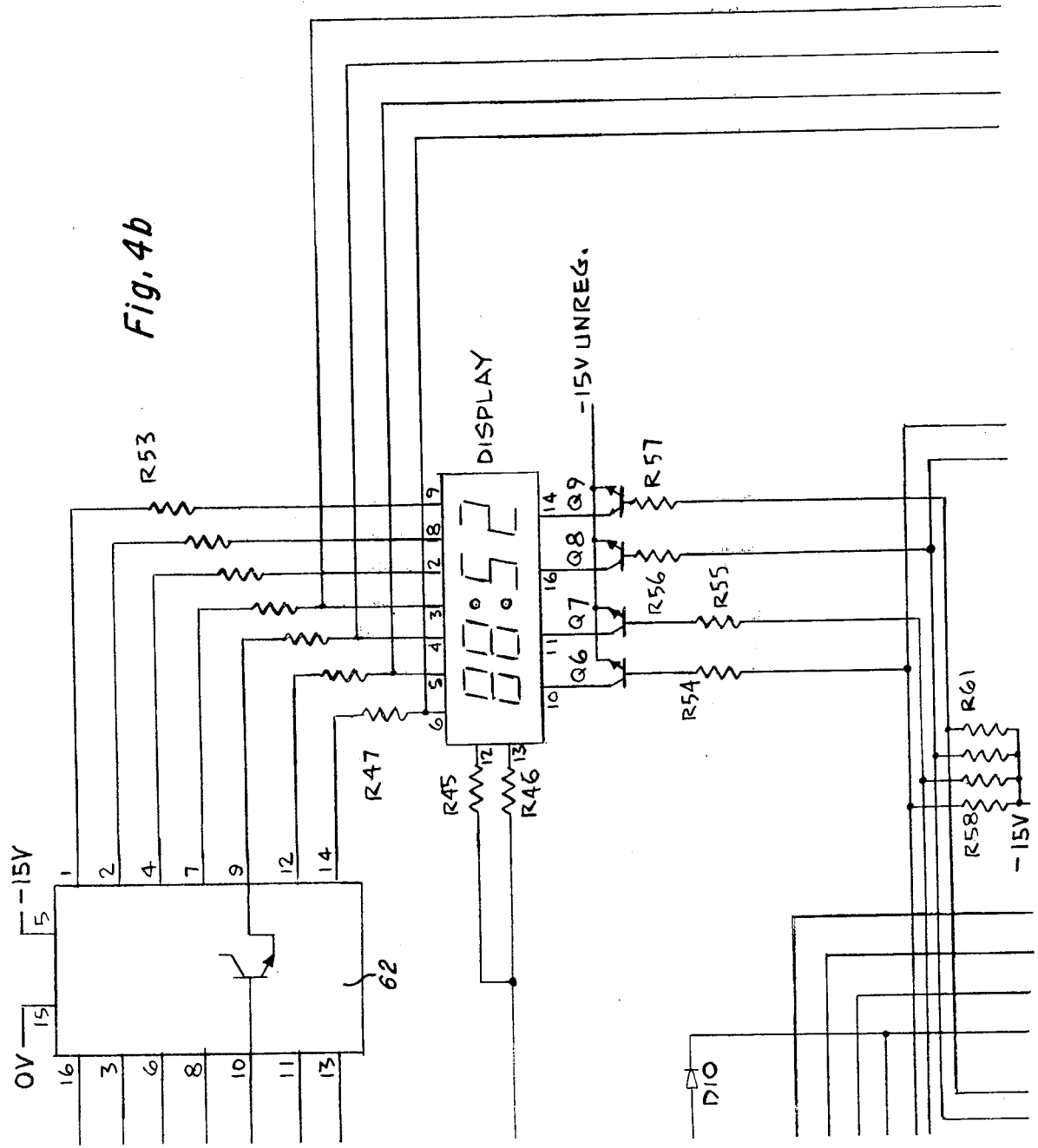
Figure 4C:
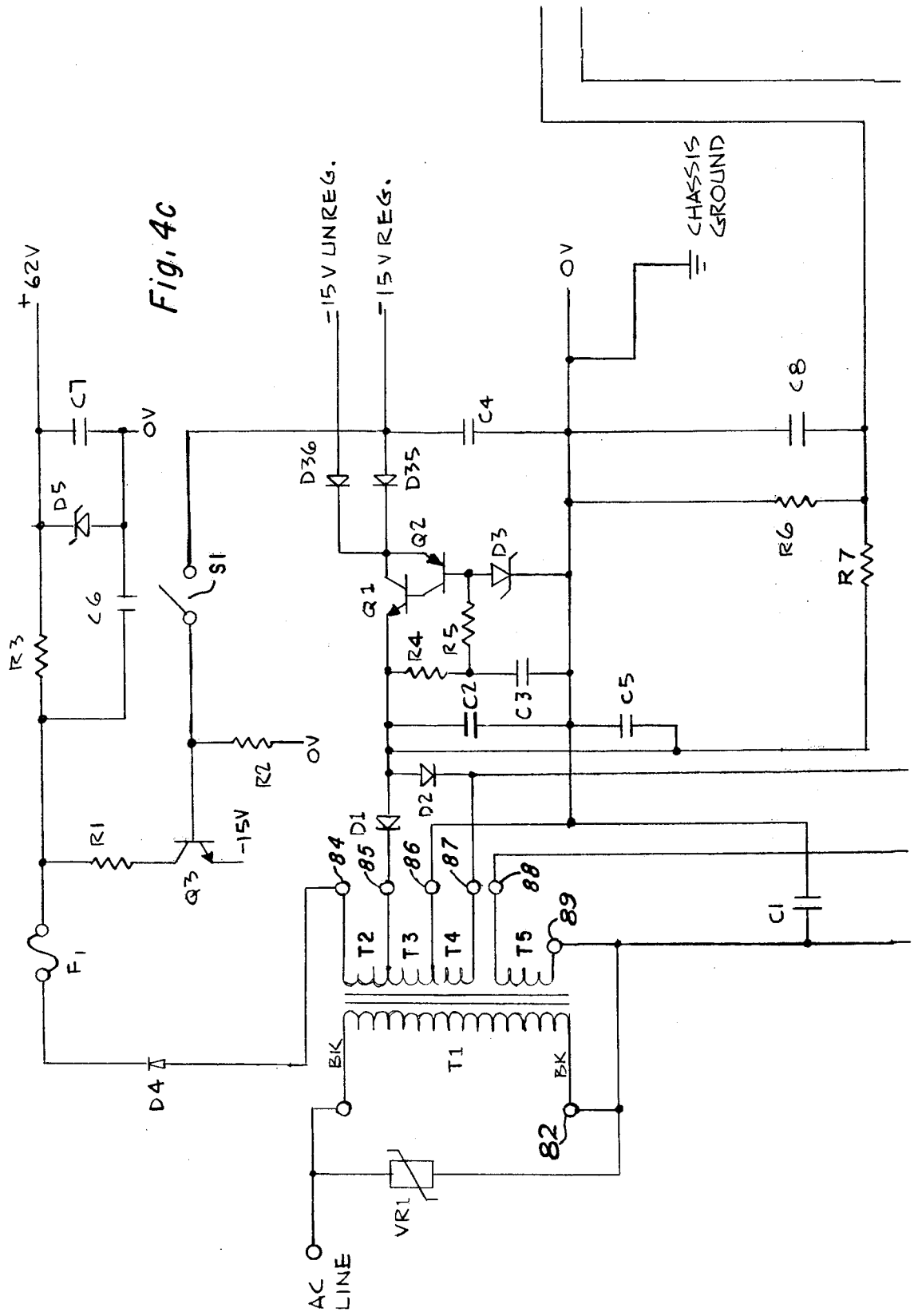
Figure 4D:
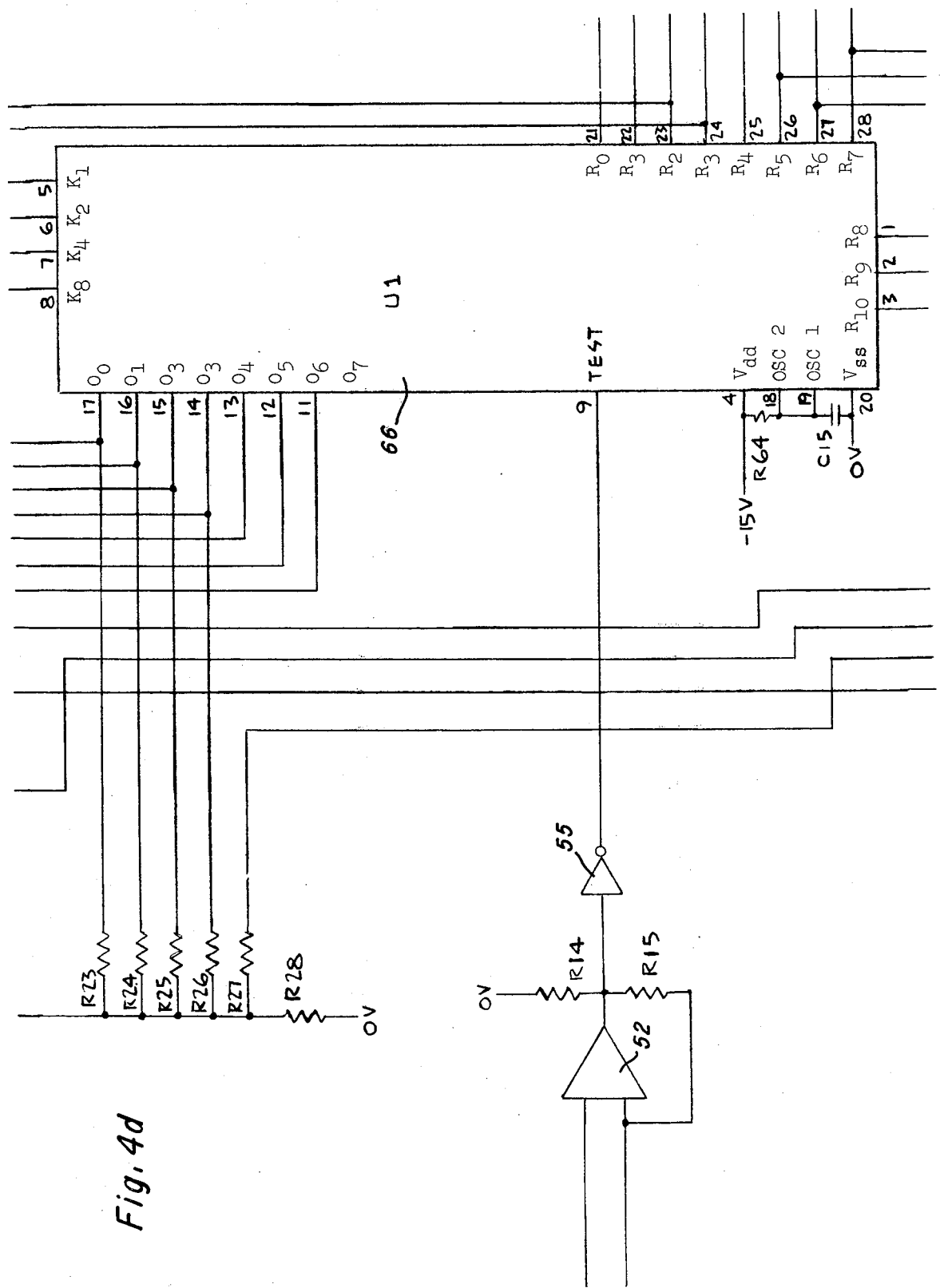
Figure 4E:
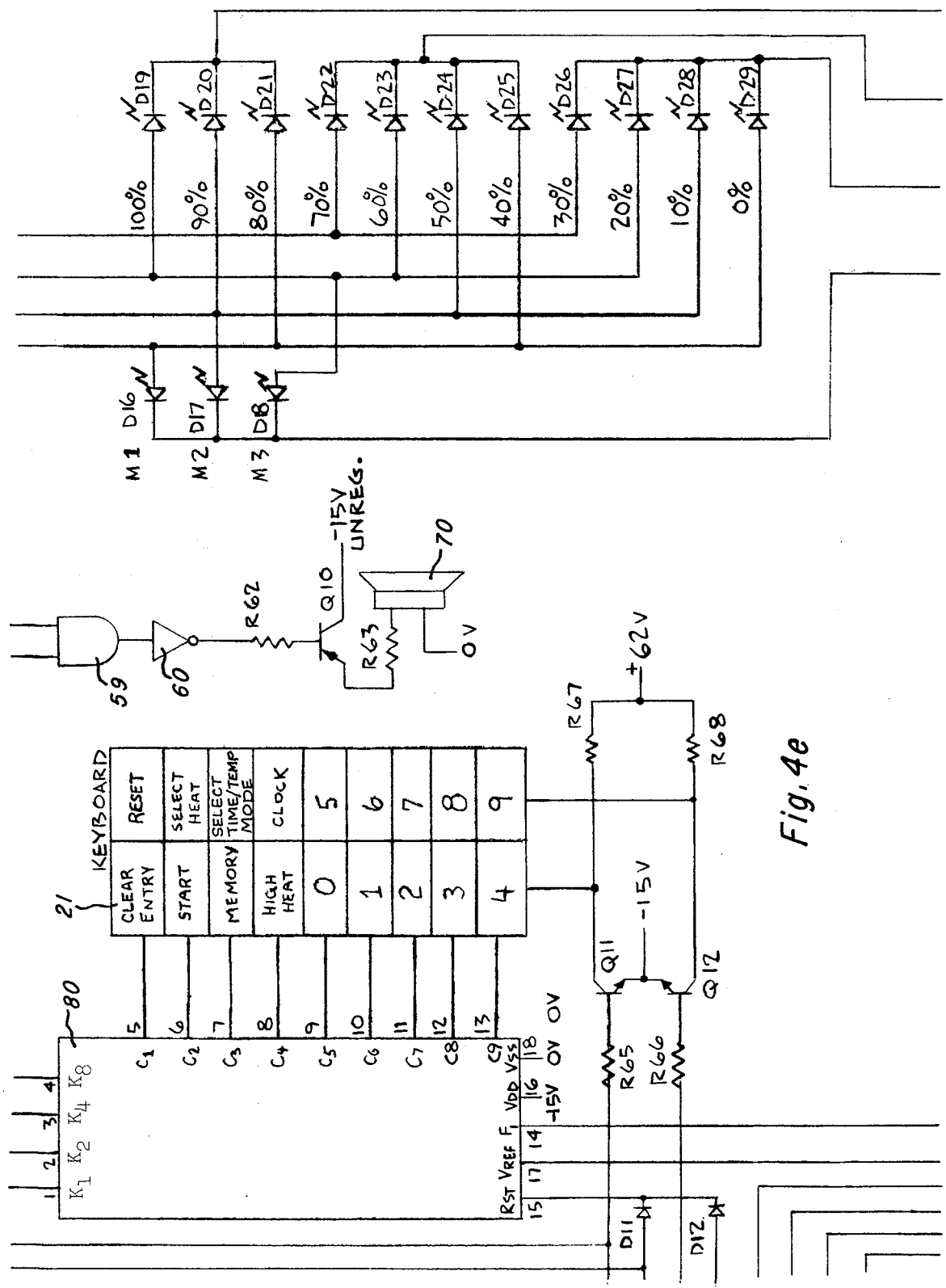
Figure 4F:
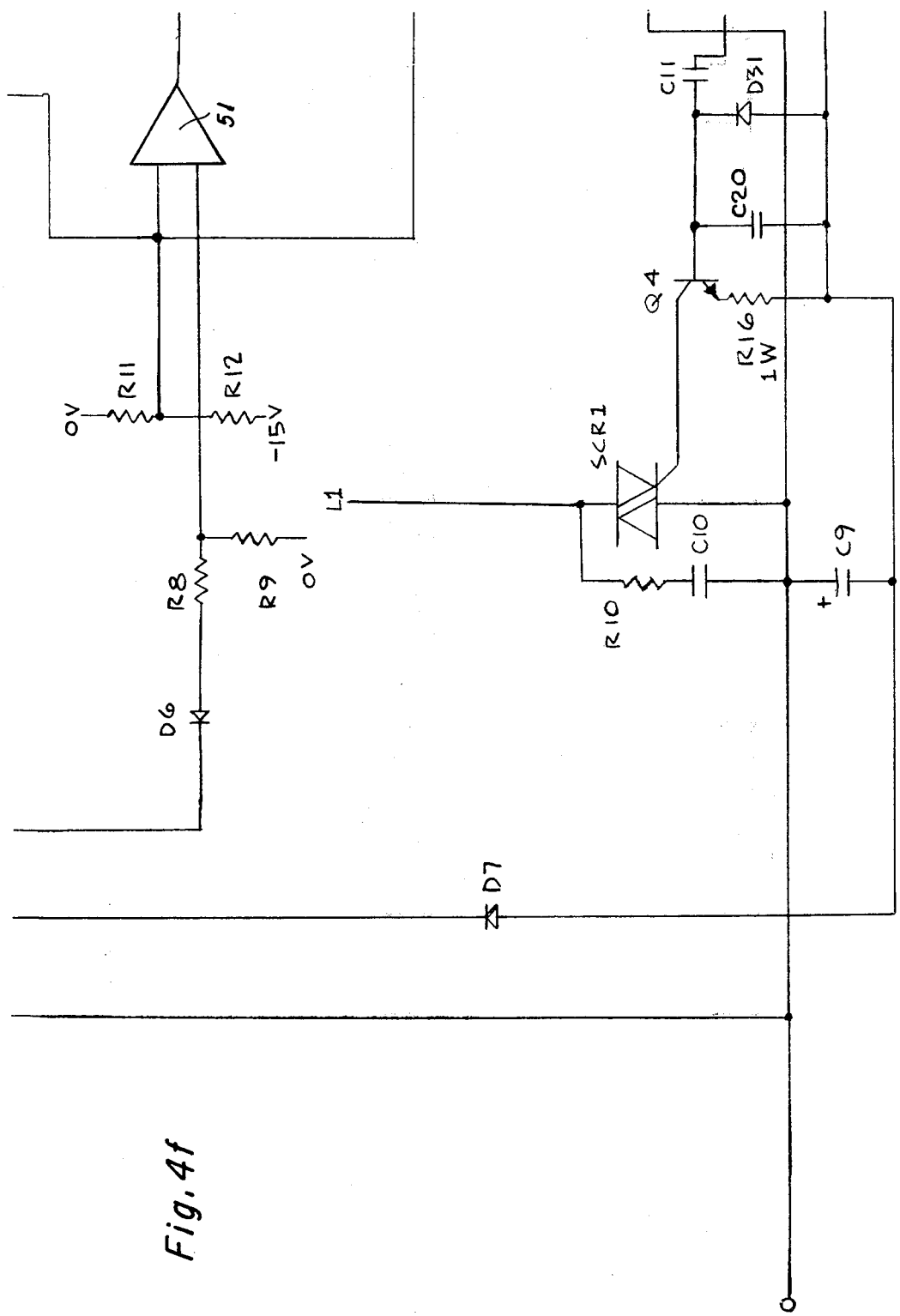

Referring to FIGS. 4c and 4f, an AC input voltage is applied across terminals 81 and 82. Varistor VR1 connected across the input terminals protects primary T1 of transformer 83 by shunting any large noise peaks. Current flow is induced in secondary circuits T2-T5 providing +62 V at a low current for the capacitive touch panel keyboard 21, as set by Zener diode D5. Also, a −15 unregulated voltage is provided at the anode of diode D36 and a −15 volts regulated supply is present at the anode of diode D35. These voltages are provided as an output of the compound Darlington pair of transistors Q1 and Q2 with a voltage set by Zener diode D3. Pin 9 (TEST) of microprocessor 66 is provided to initialize the system. That is, when pin 9 goes to "0" (−15) the microprocessor 66 is then allowed to start at the beginning of its program and when pin 9 goes to a "1", the microprocessor is inhibited, turning off all of the outputs and folding it in a non-running state until it is released to run again. As indicated earlier, the rectified voltage present at the intersection of the anodes of diodes D1 and D2 is proportional to the AC input across primary T1. This voltage is integrated through the combination of resistors R6 and R7 and capacitor C8. Capacitor C8 requires approximately one half second to become charged and therefore pin 9 is not conditioned for that period of time, permitting stabilization of the power supply. As capacitor C8 charges, the integrated waveform is transmitted to comparator 52 where it is compared with a voltage established on the other input. Comparator 52 and its associated components forms a Schmidt trigger so that when the voltage level provided from capacitor C8 and resistors R6 and R7 is equal to that provided at the other input of comparator 52, comparator 52 triggers, providing a "1" input into inverter 55 which then provides a "0" to pin 9 of microprocessor 66.

If there is a momentary loss of power from lighting or switching the AC power lines, capacitor C4 (FIG. 4c) provides an operational voltage for a short period of time, permitting the charge on C8 to drop, which then results in a "1" being present at pin 9 of microprocessor 66, turning it off in an orderly fashion. In this manner, protection is provided both in start-up and shut-down of the system. The rectified voltage present at the intersection of the anodes of diode D2 is shaped through the circuit consisting of diode D6, resistors R8 and R9, and finally, comparator 51. The output of comparator 51 is a square wave approximately 4 milliseconds in width, tied to the 60 cycles of the input line frequency. The square waves are used for system timing and particularly for controlling the gating of Triac SCR2 which in turn controls the cycling of the magnetron in such a manner as to minimize the inductive in rush currents in the magnetron transformer.

Figure 4G:
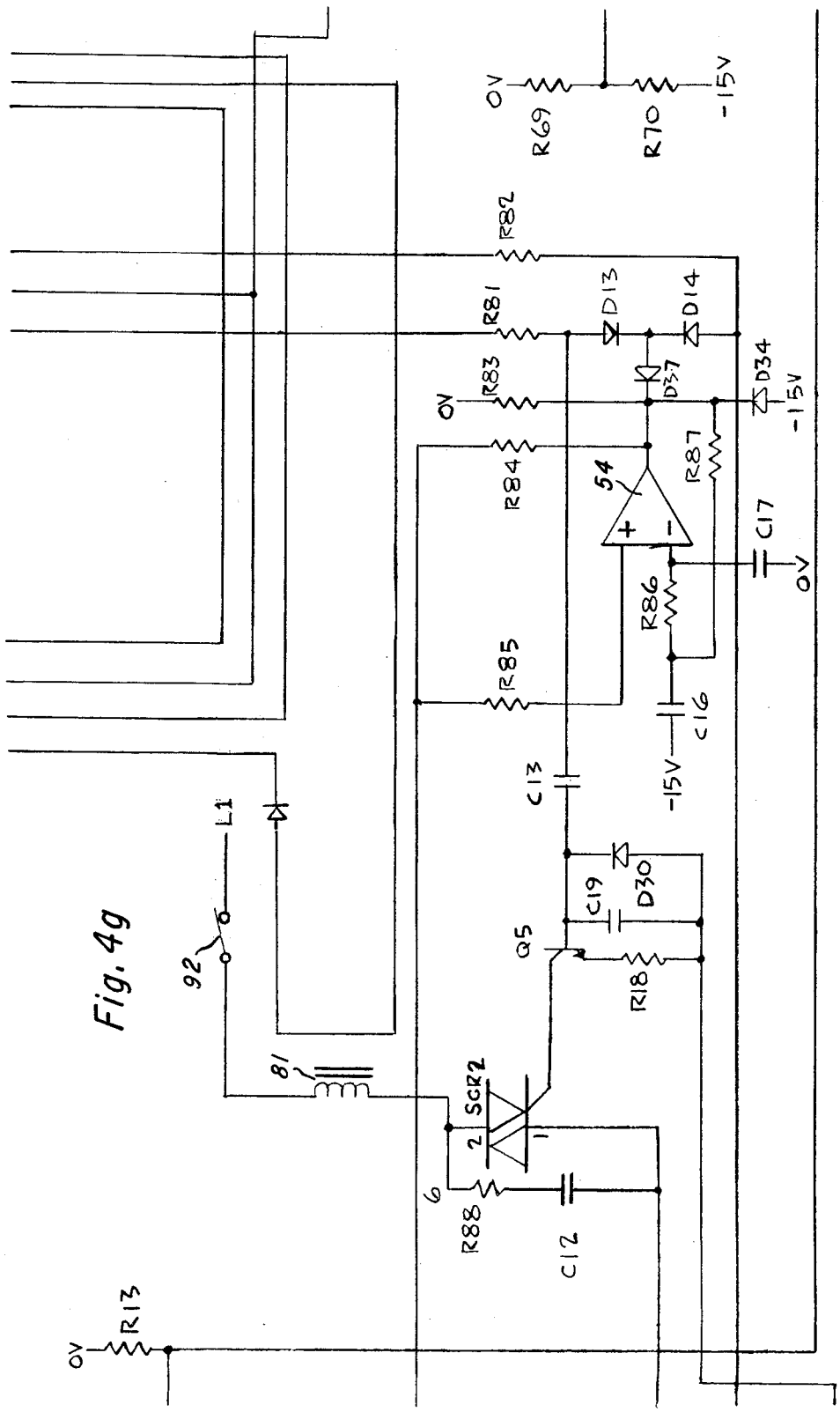

Referring now to FIGS. 2 and 4, the operation of the capacitive touch panel 21 and capacitive touch panel interface 80 will be described. Resistors R69 and R70 (FIG. 4g) provide a reference voltage to pin 17 ($V_{ref}$) of interface 80. This reference voltage serves as an input to a comparison circuit within interface 80. The base drive to transistors Q11 and Q12 is provided in timed relationship by pins 21 and 23 ($R_0$ and $R_2$) of microprocessor 66. The +62 volts is applied via the collectors of Q11 and Q12 to keyboard 21 so that transistor Q11 scans half of the pads and transistor Q12 scans the other half. In this preferred embodiment, there are 18 pads and 9 lines from keyboard 21 to interface 80. Each pad capacitance is approximately 10 picofarads. When a person touches a pad, an additional capacitance of 75 to 250 picofarads is added to the circuit. The voltage level across any of the pads is compared to the reference voltage on pin 17 of interface 80. If it is lower than the reference voltage because of the added capacitance of a person's touch, then that pad is identified and the binary coded four bit digit is presented on the output pins of interface 80. If, for example, the "Clear Entry" pad 29 is touched at the time that transistor Q11 is used for scanning, then a particular code in digital form is presented at output pins 1-4 ($k_1$-$K_8$) of intergface 80. The code plus the scanning time identifies the pad selected. If the "reset" pad had been selected, there would have been no indication of a selected pad at the time of activation of transistor Q11, but when Q12 is activated then the code would identify the selected pad as the "Reset" pad 30. The code is transmitted into microprocessor 66 via pins 5-8 ($K_1$-$K_8$) to cause the desired operation.

Figure 4H:
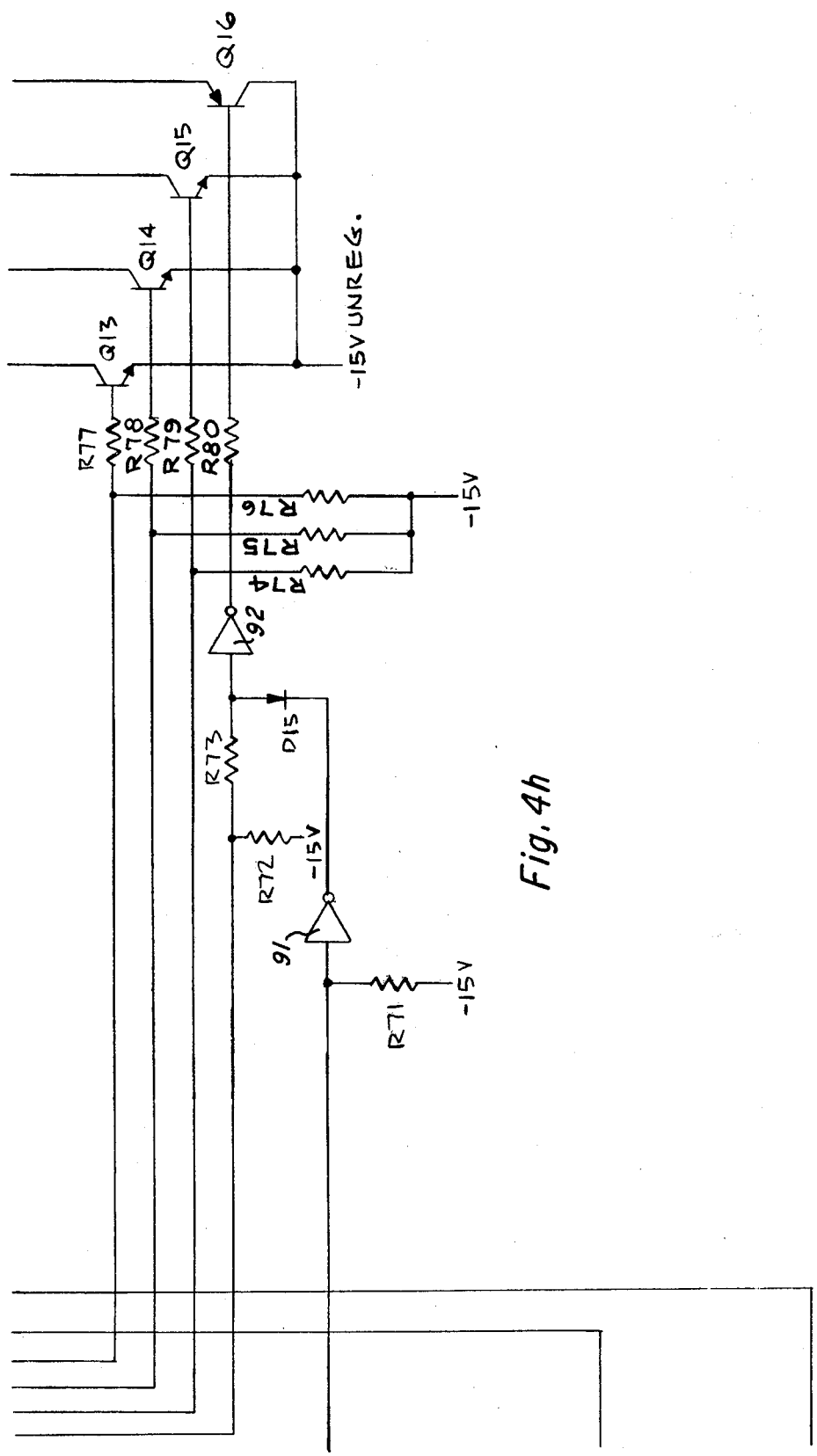

Pins 11-17 ($O_6$-$O_0$) from microprocessor 66 are used to activate the displays. Output pins 11-17 from microprocessor 66 present a code through current limiting resistors R38-R44 to the transistors of transistor array 62 and then through resistors R47-R53 to display 64 or to any of the LED's D16-D29. The selection is done by transistors Q6-Q9 (FIG. 4b) and Q13-Q16 (FIG. 4h). The bases of these transistors are driven from microprocessor 66, pins 21-28 ($R_0$-$R_7$) respectively. For example, if transistor Q13 is turned on from pin 25 ($R_4$) of microprocessor 66 and further if a code 00 is transmitted from microprocessor 66 through transistor array 62, through resistor R47 and finally through LED D16, then M1 (Memory Indicator 1) is activated as desired. The code presented determines the segments of a particular character to be lit when one of transistors Q6-Q9 is selected.

To provide a signal through speaker 70, AND circuit 58 must receive a "1" input from each of pins 22 ($R_1$) and 24 ($R_3$) from microprocessor 66 which provides a "0" on the base of transistor Q10, turning that transistor on, and causing the speaker to sound.

Triac SCR1 for activating the fan motor, lamp and filament conducts where a pin 1 ($R_8$) of microprocessor 66 is a "1". Triac SCR2 conducts when pin 3 ($R_{10}$) is a "1". Pin 1 is a "1" whenever cooking is being done. Pin 3 is a "1" cyclicly, depending upon the heat selected as indicated by LED's D19-D29. That is, a selection of 100% causes the magnetron to operate continuously during cooking, while a duty cycle of 50% causes the magnetron to operate half of the time. Comparator 54 and the associated components provide oscillations at a frequency of about 150 kilohertz. The oscillator is continuously running. When pin 3 is a "1", then diode D13 conducts, presenting the oscillations to capacitor C13, which in turn turns on transistor Q5. Current through the collector of transistor Q5 turns on triac SCR2, which in turn provides current flow through the magnetron transformer. The switch S2 is a door interlock for the oven that must be closed to complete the circuit to terminal L1.

The "1" from pin 1 is a pulse that is transmitted 2 ms. from the occurrence of a 4 ms. square wave pulse developed from comparator 51 and sent to the microprocessor 66 on pin 14. In the same manner, when a "1" is present on pin 1 of microprocessor 66, diode D14 conducts, permitting the oscillations from comparator 54 to be presented to capacitor C11, turning on transistor Q4. Triac SCR1 is thereby turned on, permitting current to flow for activation of the fan motor, lamp, and filament to terminal L1.

The operator may set heat and time for cooking. He may also operate in a temperature mode which requires that a temperature probe containing a thermistor 53 be inserted into the food to be cooked. When the probe is inserted, switch SS3 remains open and a signal is transmitted through inverter 57 and AND gate 58 through diode D10 to pin 5 ($F_1$) of microprocessor 66.

In addition, there is a connection made to the display 64 through resistors R45 and R46. When the probe is in and the switch is open, the colon in the display goes out. Microprocessor 66 provides an input from pin 27 ($R_6$) to AND gate 58 to provide an input to pin 5, as mentioned above, to determine that the system is being operated in the temperature mode. Comparator 53 is used to monitor the temperature as indicated on the thermistor probe with the other input coming from a resistor ladder comprised of resistors R23-R27. The thermistor is simply a resistor whose resistance changes as a function of the ambient temperature. That is, when the temperature of the food into which the probe has been inserted increases, the resistance of the thermistor decreases. Having this comparison means to change an analog to a digital representation is the subject of copending U.S. Patent Application Ser. No. 743,900 and entitled "Low Cost Digital Thermometer for Microprocessor Applications" filed 11/22/1976 and assigned to the assignee of this invention. Briefly, when the microprocessor 66, through its program installed in the ROM, determines that it is time to monitor the temperature of the food, a signal is sent out on pin 2 ($R_9$) of the microprocessor 66 to AND cicuit 56, enabling the output from that circuit. The comparator 53 has its other input increased by R23-R27 which is a resistive ladder with increasing powers of resistance to formulate a digital representation. When both inputs to comparator 53 are equal, then an output toggles AND circuit 56, which provides an input to pin 6 ($K_2$) of microprocessor 66 through its pin 28 ($R_7$) and pins 14-17 ($O_3$-$O_0$) connections, the microprocessor is able to determine the temperature and display it. Furthermore, if the temperature is that which has been preset, the cooking cycle will be turned off.

Following are examples of Time Cook Mode and of Temperature Cook Mode, together with explanatory material.

VERBAL STATE FLOW DESCRIPTION

PAD FUNCTION DEFINITION

START: Initiates all cooking cycles and starts clock after data entry.

CLOCK: Selected to enter clock data or recall time of day to display during cooking cycles.

MEMORY: Stores prior entry cooking data in memory.

TIME/TEMP: Enters Time programming mode to display (probe out) or Temp programming mode and set temperature to display (probe in).

SELECT HEAT: For entry or display of heat level (duty cycle) for magnetron.

STOP: Halts all cooking operations when selected. Memory contents are unaffected.

CLEAR: Allows changing of last data entry without affecting all other memory data. Functional only after selection of select Time/Temp or select Heat.

RESET: Clears all memory and returns display to Time of Day mode. Inhibited during cooking modes.

DIGITS 0-9: Data entry for Time, Temperature, and Heat Level (duty cycles).

DISPLAY MODES

O Twelve Hour Clock: Automatically displayed when oven is plugged in and not cooking and is automatically brought to display at completion of cooking cycles. Colons will be blanked when temperature probe is inserted. Display may be changes by selection of the Clock pad, Digits, and Start.

O Timed Cook Display: (Temp probe out) When time (temp pad is actuated, the display will show only colons and a zero as the fourth digit, as shown below.

0

The first non-zero digit selected replaces the zero. Selection of subsequent digits (four maximum) will shift display left with fourth digit entered appearing in the right-most position as shown below for entry sequence of 1-2-3-4.

13:34

After programming time and selecting start, the display countsdown at a 1 Hz. rate. Note: Invalid entry causes display to revert to 0 when Start or Memory is selected. When countdown reaches zero, the display illuminates only dot and the one colon for three seconds while alarm is sounded.

Display then returns to Time of Day.

O Temp Cook Display: (Temp probe in) Actuation of Time/Temp pad, causes controller to go into the temp cook mode. Colons are blanked with insertion of probe. Display during data entry is identical to time mode except that a maximum of three digits may be entered. Invalid temperatures (outside of 100-225 range) are cleared to zero upon selection of Memory or Start. Given a valid temperature entry and a detected probe temperature less than 100° F., the display will show as follows:

One 00

As the detected temp reaches 105° F. the display will update to 105. Updates will continue in 5° F. increments until set temp is reached. The display is then blanked during sounding of the end of cooking alarm.

O Heat Level Indicators: Eleven VLED indicators are provided to display magnetron duty cycle. The display is set by Select Heat and a digit and/or clear. A single VLED indicates 0% duty cycle (i.e., magnetron always off). Each indicator has a value of 10% so that the top (eleventh) indicator denotes 100% duty cycle (i.e., magnetron always on.) Initial selection of Select Heat turns all indicators on (100% duty cycle implied).

Touching a digit, for example a "6" changes the heat level indicator display to illuminate seven of the VLED indicators. Touching Clear changes power level to 100% and all eleven VLED indicators are illuminated. Touching another digit will now modify the display without the use of Select Heat; for example a "0" will cause a single VLED to be illuminated. Modification of power level is allowed either before or during a cooking cycle. No digit will affect the display until Select Heat is touched again. The display is blanked during alarm and time of day modes.

ALARM: Used to signal the end of a cooking sequence. The Alarm is four tones of approximately 750 Hz for 25 millisecond durations. Tones are at one-second intervals.

PROBE: Insertion of the temperature probe is the only means of selecting temperature mode of cooking. Upon insertion, the colon in the clock display will be blanked. When the door is closed once after probe insertion (may be reopened if desired) the control may be programmed in temperature mode. A thermistor sensor is the temperature detector for the control logic.

DOOR INTERLOCK: The logic senses the condition of the door (open/closed) and controls the oven operation as follows:

Door Closed:

O Cooking modes are operable

O Time/Temp selection is made upon door closure (conditional on presence of the probe).

Door Open

O Cooking sequences are inhibited, memory contents are unchanged.

O All programming sequences allowed.

TIMEOUT:

O Active during cooking only.

O Automatically returns "active" cooking memory to display 30 seconds after another function has been selected.

OPERATION

SCOPE: The following discussion is a general operating sequence showing major characteristics of controller operation. Numbers are chosen for examples for the sake of clarity. For formal operation information the State Flow Diagram should be consulted.

POWER UP/TIME OF DAY CLOCK SETUP

After plugging the oven into the AC wall outlet, the clock display will begin clocking at 12:00. To set the clock to the correct time of day, the following sequence should be followed:

| Action | Display | |
|---|---|---|
| (1) Touch Clock Pad | 12:00 | No Change |
| (2) Select digit (example "3") | ::3 | Display Digit |
| (3) Select digit (example "4") | ::34 | Display Digit |
| (4) Select digit (example "5") | :3:45 | Display Digit |
| (5) Touch START | 3:45 | Start clock counting time of day |

If an error is made in the entry, touch Reset, display will revert to previous time of day, then enter proper time. Following example shows error correction process:

| | | |
|---|---|---|
| (1) Touch Clock Pad | 02:00 | No Change |
| (2) Digit ("9") | 00:09 | Display Digit |
| (3) Digit ("7") Incorrect Entry | 00:97 | Display Digit |
| (4) RESET | 02:00 | Return previous time of day |
| (5) Clock | 02:00 | No Change |
| (6) Digit ("9") | 00:09 | Display Digit |
| (7) Digit ("1") | 00:91 | Display Digit |
| (8) Digit ("5") | 09:15 | Display Digit |
| (9) Touch START | 9:15 | Start clock counting time of day |

TIMED COOKING EXAMPLE

Table 1 presents a hypothetical sequence of operations with appropriate display, status and comment. This example covers the following situations:

(a) Step 1-4: Selection of a cook time
(b) Step 5-6: Selection of a power level
(c) Step 7: Initiation of cooking
(d) Step 8-13: Interruption and resumption of cooking via Door Interlock and/or Stop pad
(e) Step 14-15: Modification of power level while cooking
(f) Step 16-20: Illegal entry clearing by operator
(g) Step 21-24: Illegal entry detection and clearing by microprocessor
(h) Step 25-28: Correct modification of cook time
(i) Step 29-30: Time Out and Alarm
(j) Step 31-47: Program Time and Power Level in all three memories
(k) Step 48-57: Execution of program to Time Out
(l) Step 58: Time of Day; all memories cleared

TABLE 1

TIME COOK EXAMPLE
(No entry implies no change from previous step)

| STEP | CLOCK DISPLAY | POWER LEVEL | PAD ACTUATED | DOOR | COMMENT |
|---|---|---|---|---|---|
| 0 | 12:34 | Blanked | None | Open or Closed | Time of Day mode |
| 1 | :0 | 11 Indicators on (100%) | Select Time | Open or Closed | Select Time |
| 2 | :1 | 11 Indicators on (100%) | Digit 1 | Open or Closed | |
| 3 | :10 | 11 Indicators on (100%) | Digit 2 | Open or Closed | |
| 4 | 1:05 | 11 Indicators on (100%) | Digit 5 | Open or Closed | Cook time of 1 min-5 sec |
| 5 | " | 11 Indicators on (100%) | Select Heat | Open or Closed | Setting Power Level |
| 6 | " | Bottom 6 indicators (50% duty cycle) | Digit 5 | Open or Closed | To 50% |
| 7 | " | Bottom 6 indicators (50% duty cycle) | Start | Closed | Start Cook Cycle |
| 8 | Counting Down | Bottom 6 indicators (50% duty cycle) | None | Closed | Cooking |
| 9 | :47 | Bottom 6 indicators (50% duty cycle) | None | Open | Display holds at time of door opening |
| 10 | " | Bottom 6 indicators (50% duty cycle) | None | Closed | |
| 11 | Countdown | Bottom 6 indicators (50% duty cycle) | Start | " | Continue Cook Cycle |
| 12 | :43 | Bottom 6 indicators (50% duty cycle) | Stop | Open or closed | Interrupt cook cycle with Stop. Door may be opened or closed |
| 13 | Countdown | Bottom 6 indicators (50% duty cycle) | Start | Closed | Continue Cook |
| 14 | Countdown | Bottom 6 indicators (50% duty cycle) | Select Heat | Closed | Change heat level to |
| 15 | " | Bottom 1 Ind. 0% Duty Cycle | Digit 0 | " | 0% Duty Cycle |
| 16 | :0 | Bottom 1 Ind. 0% Duty Cycle | Select Time | Closed | Change time to 6 Min, 0 Sec |
| 17 | :9 | Bottom 1 Ind. 0% Duty Cycle | Digit 9 | " | Cooking continues Uninterrupted |
| 18 | :96 | Bottom 1 Ind. 0% Duty Cycle | Digit 6 | " | |
| 19 | 9:67 | Bottom 1 Ind. 0% Duty Cycle | Digit 7 | " | |
| 20 | :0 | Bottom 1 Ind. 0% Duty Cycle | Clear | | Operator correction of Illegal entry |
| 21 | :9 | Bottom 1 Ind. 0% Duty Cycle | Digit 9 | | |
| 22 | :97 | | Digit 7 | | |
| 23 | 9:77 | | Digit 7 | | |
| 24 | :0 | | Start | | Controller Detection of Illegal Entry |

TABLE 1-continued

TIME COOK EXAMPLE
(No entry implies no change from previous step)

| STEP | CLOCK DISPLAY | POWER LEVEL | PAD ACTUATED | DOOR | COMMENT |
|---|---|---|---|---|---|
| 25 | : 9 | | Digit 9 | | |
| 26 | :9 5 | | Digit 5 | | |
| 27 | 9:57 | | Digit 7 | | |
| 28 | Countdown | | Start | | Correct entry of new Time |
| 29 | : 1 | 0% Duty Cycle | None | Closed | Time Out |
| 30 | | Blanked | None | Closed | Alarm Sounds, Cooktime expired |
| 31 | 12:45 | Blanked | None | Open or Closed | Time of Day |
| 32 | : 0 | All 11 Ind. on | Select Heat | Open or Closed | Select Heat Memory Level 1 |
| 33 | : 0 | Bottom 4 Ind. on - 30% power | Digit 3 | Open or Closed | |
| 34 | : 0 | | Select Time | Open or Closed | Select Time Memory 1 |
| 35 | : 1 | Bottom 4 Ind. on 30% Power Level | Digit 1 | Open or Closed | |
| 36 | : 15 | | Digit 5 | Open or Closed | |
| 37 | : 0 | All 11 Ind. On. | Memory | Open or Closed | Move to Memory 2 (Mem.2 ind. on) |
| 38 | : 0 | " | Select Time | Open or Closed | Select Time Mem. 2 |
| 39 | : 9 | " | Digit 9 | Open or Closed | |
| 40 | : 9 | " | Select Heat | Open or Closed | Select Power Level Memory 2 |
| 41 | : 9 | Bottom 2 Ind. on - 10% power level | Digit 1 | Open or Closed | |
| 42 | : 0 | All 11 Ind. on | Memory | Open or Closed | Move to Mem. 3 (Mem. 3 Ind. on) |
| 43 | : 0 | " | Select Time | Open or Closed | Select Time Mem. 3 |
| 44 | : 2 | " | Digit 2 | Open or Closed | |
| 45 | :20 | " | Digit 0 | Open or Closed | |
| 46 | :20 | " | Select Heat | Open or Closed | Select Power Level Memory 3 |
| 47 | :20 | Bottom 10 Ind. on 90% Power Level | Digit 9 | Open or Closed | |
| 48 | : 15 | 30% | Start | Closed | Start cooking in lowest programmed Memory |
| 49 | Countdown | 30% | None | Closed | Memory Level 1 Indicator on. |
| 50 | : 1 | " | " | " | Memory Level 1 Indicator on. |
| 51 | : 9 | 10% | " | " | Memory Level 2 Indicator on (Mem 1 off) |
| 52 | Countdown | " | " | " | Memory Level 2 Indicator on (Mem 1 off) |
| 53 | 1 | " | " | " | Memory Level 2 Indicator on (Mem 1 off) |
| 54 | :20 | 90% | " | " | Memory 3 Indicator on Mem. 2 off |
| 55 | Countdown | " | " | " | |
| 56 | : 1 | " | " | " | Timeout |
| 57 | : | Blanked | " | " | Alarm |
| 58 | 12:46 | Blanked | " | " | Time of Day |

TEMPERATURE COOKING EXAMPLE

Table 2 illustrates a hypothetical cooking example in the temperature mode. It is assumed that the probe is plugged into its jack, inserted into the object being cooked and the door has been closed. Note that until the door is closed, the microprocessor will not recognize a change in time/temp mode. Since most pads operate the same in both cooking modes, common operations like Clear Entry, Door Open, etc. are not discussed here. Refer to Time mode example for their operation.

(a) Step 1-4: Select temperature memory level 1.
(b) Step 5-6: Select duty cycle memory level 1.
(c) Step 7-13: Select temp and power level memory level 2.
(d) Step 14-18: Select temp memory level 3. Power level is assumed to be 100% by microprocessor when heat level is not specified.
(e) Step 19-20: Start cooking, under temperature display mode.
(f) Step 21-23: Temperature is updated once every second. Display reads next lowest even 5° increment.
(g) Step 24-25: For set point of 120, the transition is shown from memory 1 to memory 2.
(h) Step 26-27: For set point of 158, actual transition occurs at 155 from memory 2 to memory 3.
(i) Step 28-29: Conclusion of cooking. Notice that for set point of 220, the largest number displayed is 215. Alarm occurs at 220.
(j) Step 30: Time of day, memories cleared.

TABLE 2

TEMPERATURE COOKING EXAMPLE

| STEP | CLOCK DISPLAY | POWER LEVEL | THERMISTOR TEMP IN °F. | PAD ACTUATED | COMMENT |
|---|---|---|---|---|---|
| 0 | 11 30 | Blanked | 75 | None | Time of Day (Colons are out because of probe) |
| 1 | 0 | 100% | 75 | Select Temp | Select Temp Memory 1 |
| 2 | 1 | 100% | 75 | Digit 1 | |
| 3 | 12 | 100% | 75 | Digit 2 | |
| 4 | 1 20 | 100% | 75 | Digit 0 | |
| 5 | 1 20 | 100% | 75 | Sel Heat | Select Power Level-Mem 1 |
| 6 | 1 20 | 50% | 75 | Digit 5 | |
| 7 | 0 | 100% | 75 | Memory | Move to Memory Level 2 Memory 1 indicator off Memory 2 on |
| 8 | 0 | 100% | 75 | Sel Temp | Select Temp, Memory 2 |
| 9 | 1 | 100% | 75 | Digit 1 | |
| 10 | 15 | 100% | 75 | Digit 5 | |
| 11 | 1 58 | 100% | 75 | Digit 8 | |
| 12 | 1 58 | 100% | 75 | Sel Heat | Select Heat Memory 2 |
| 13 | 1 58 | 70% | 75 | Digit 7 | |
| 14 | 0 | 100% | 75 | Memory | Move to Memory 3 |
| 15 | 0 | 100% | 75 | Sel Temp | Select Temp, Memory 3 |
| 16 | 2 | 100% | 75 | Digit 2 | Note-Power Level is 100% |
| 17 | 22 | 100% | 75 | Digit 2 | because it is not modified |
| 18 | 2 20 | 100% | 75 | Digit 0 | |
| 19 | 1 00 | 50% | 75 | Start | |
| 20 | 1 00 | 50% | 104 | None | Undertemp (104° F.) display is 100 Memory level 1 |
| 21 | 1 05 | 50% | 105 | None | |
| 22 | 1 05 | 50% | 109 | None | |
| 23 | 1 10 | 50% | 110 | None | |
| 24 | 1 15 | 50% | 119 | None | Memory Level 1 |
| 25 | 1 20 | 70% | 120 | None | Memory Level 2 |
| 26 | 1 50 | 70% | 154 | None | Rounds to next lowest 5° increment |
| 27 | 1 55 | 100% | 155 | None | Memory Level 3 |
| 28 | 2 15 | 100% | 219 | None | |
| 29 | Blanked | Blanked | 220 | None | Alarm |
| 30 | 11 51 | Blanked | — | — | Time of Day |

Those skilled in the art understand that many substitutions of components may be made without departing from the spirit of this invention. For example, a TMS1000 microprocessor may be removed in favor of another microprocessor. Also, the logic may be rearranged to arrive at the same result.

What is claimed is:

1. A solid state controller for automatically controlling the temperature of a heating element of an oven for each of a selected number of cooking cycles and for a selected length of time for each of said cooking cycles, said controller comprising:

(a) a transformer for connection to a 60-Hz AC line voltage power source;

(b) electrically controllable means for activating and deactivating said heating element;

(c) semiconductor microprocessor means including a programmed ROM containing a permanently stored instruction set for controlling said controllable means to selectively activate and deactivate said heating element according to said instruction set and data entered into said microprocessor means;

(d) a keyboard array data entry means having a plurality of keys selectively coupled to said microprocessor means for entering therein in dependence upon the state of said keys;

(e) means for coupling said controllable means to said microprocessor means for control thereof;

(f) display means coupled to said microprocessor means for displaying desired parameters including data entered from said keyboard array data entry means;

(g) clocking means coupled to said microprocessor means for generating clock signals for the operation thereof;

(h) power input control means coupled to said microprocessor means for preventing adverse effects caused by undesired alteration of the state of said microprocessor means due to sudden surges of said line voltage, abnormally low line voltage or momentary loss of power, said power input control means including:

(i) rectifier means connected to a secondary winding of said transformer for providing a rectified voltage representative of the 60-Hz AC line voltage, (ii) comparison means for comparing said rectified voltage with a predetermined voltage level, said comparison means being connected to said microprocessor means for providing a start signal when a comparison exists, and (iii) a power-up delay capacitor connected to receive the rectified voltage and selected to require a predetermined time to charge to the value of the rectified voltage thereby providing a known delay to said comparison means.

2. A solid state controller according to claim 1, wherein said rectifier means includes a power-down capacitor connected to said secondary winding for maintaining a predetermined DC voltage level in case of a sudden loss of power from said 60-Hz AC line voltage power source for a time sufficient to permit discharge of said power-up delay capacitor and blocking diode means connected to said power-down capacitor for blocking power to said microprocessor means when the voltage stored in said power-down capacitor drops below said predetermined DC voltage level.

3. A solid state controller according to claim 1, wherein said clocking means includes a tap on said secondary winding for receiving an unrectified voltage and pulse rectifying and shaping means for providing a squarewave pulse to said microprocessor means, said squarewave pulse being a function of the frequency of said 60-Hz AC line voltage.

* * * * *